(12) United States Patent
Lee et al.

(10) Patent No.: US 10,762,295 B2
(45) Date of Patent: Sep. 1, 2020

(54) APPARATUS AND METHOD FOR PROVIDING SENTENCE BASED ON USER INPUT

(71) Applicant: SAMSUNG ELECTRONICS CO., LTD., Suwon-si, Gyeonggi-do (KR)

(72) Inventors: Ji-yeon Lee, Suwon-si (KR); Ji-hyun Rho, Seoul (KR); Won-ho Ryu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 49 days.

(21) Appl. No.: 15/821,927

(22) Filed: Nov. 24, 2017

(65) Prior Publication Data
US 2018/0150449 A1    May 31, 2018

(30) Foreign Application Priority Data

Nov. 29, 2016 (KR) .................. 10-2016-0160783
Oct. 31, 2017 (KR) .................. 10-2017-0144234

(51) Int. Cl.
*G06F 40/274* (2020.01)
*G06F 3/023* (2006.01)
(Continued)

(52) U.S. Cl.
CPC .......... *G06F 40/274* (2020.01); *G06F 3/0237* (2013.01); *G06F 3/0482* (2013.01); *G06F 3/04842* (2013.01); *G06F 3/04886* (2013.01)

(58) Field of Classification Search
CPC .... G06F 17/276; G06F 3/0237; G06F 3/0482; G06F 3/04842; G06F 3/04886; G06F 40/274
See application file for complete search history.

(56) References Cited

U.S. PATENT DOCUMENTS 5,623,406 A * 4/1997 Ichbiah ................ G06F 9/453
704/3
9,026,426 B2    5/2015 Wu et al.
(Continued)

FOREIGN PATENT DOCUMENTS

| EP | 1 657 625 A2 | 5/2006 |
| KR | 10-2015-0128951 | 11/2015 |
| WO | 2015/087084 | 6/2015 |

OTHER PUBLICATIONS

Search Report dated Mar. 5, 2018 in counterpart International Patent Application No. PCT/KR2017/013328.
(Continued)

*Primary Examiner* — Sonia L Gay
(74) *Attorney, Agent, or Firm* — Nixon & Vanderhye P.C.

(57) ABSTRACT

Disclosed are an apparatus and/or method for providing a sentence based on a user input. When a sentence corresponding to a shorthand word input from a user is generated and provided to the user, a sentence most suitable for a current context is provided to the user by further considering context information. At least a portion of the method for providing a sentence based on a user input may be performed using a rule-based model and/or an artificial intelligence model learned according to at least one of neural network or deep learning algorithms. The rule-based model and/or artificial intelligence model may provide a sentence most suitable for a current context to the user by using the input shorthand word and the context information as input values.

18 Claims, 12 Drawing Sheets

(51) Int. Cl.
*G06F 3/0482* (2013.01)
*G06F 3/0488* (2013.01)
*G06F 3/0484* (2013.01)

(56) References Cited

U.S. PATENT DOCUMENTS

| | | |
|---|---|---|
| 2002/0156774 A1 | 10/2002 | Beauregard et al. |
| 2007/0099602 A1 | 5/2007 | Kurlander et al. |
| 2008/0059421 A1* | 3/2008 | Baartman ............. G06F 40/232 |
| 2010/0023317 A1 | 1/2010 | Fux et al. |
| 2010/0030551 A1* | 2/2010 | Ark ....................... G06F 40/242 |
| | | 704/8 |
| 2010/0299138 A1 | 11/2010 | Kim |
| 2011/0131488 A1* | 6/2011 | Kang ................ G06F 16/24578 |
| | | 715/261 |
| 2012/0262461 A1 | 10/2012 | Fisher et al. |
| 2013/0262994 A1 | 10/2013 | McMaster |
| 2014/0310627 A1* | 10/2014 | Kim ...................... G06F 17/214 |
| | | 715/769 |
| 2014/0351687 A1 | 11/2014 | Hall |
| 2015/0095127 A1* | 4/2015 | Patel ................... G06Q 30/0214 |
| | | 705/14.16 |
| 2015/0113073 A1* | 4/2015 | Chan ...................... G06F 3/0233 |
| | | 709/206 |
| 2016/0027045 A1 | 1/2016 | Kurian et al. |
| 2016/0071511 A1 | 3/2016 | Park et al. |
| 2016/0105386 A1* | 4/2016 | Anders ................. G06F 40/157 |
| | | 709/206 |
| 2016/0224524 A1* | 8/2016 | Kay ...................... G06F 16/252 |
| 2017/0249291 A1* | 8/2017 | Patel ..................... G06F 17/276 |

OTHER PUBLICATIONS

Extended European Search Report dated Oct. 10, 2019 for EP Application No. 17875469.3.

* cited by examiner

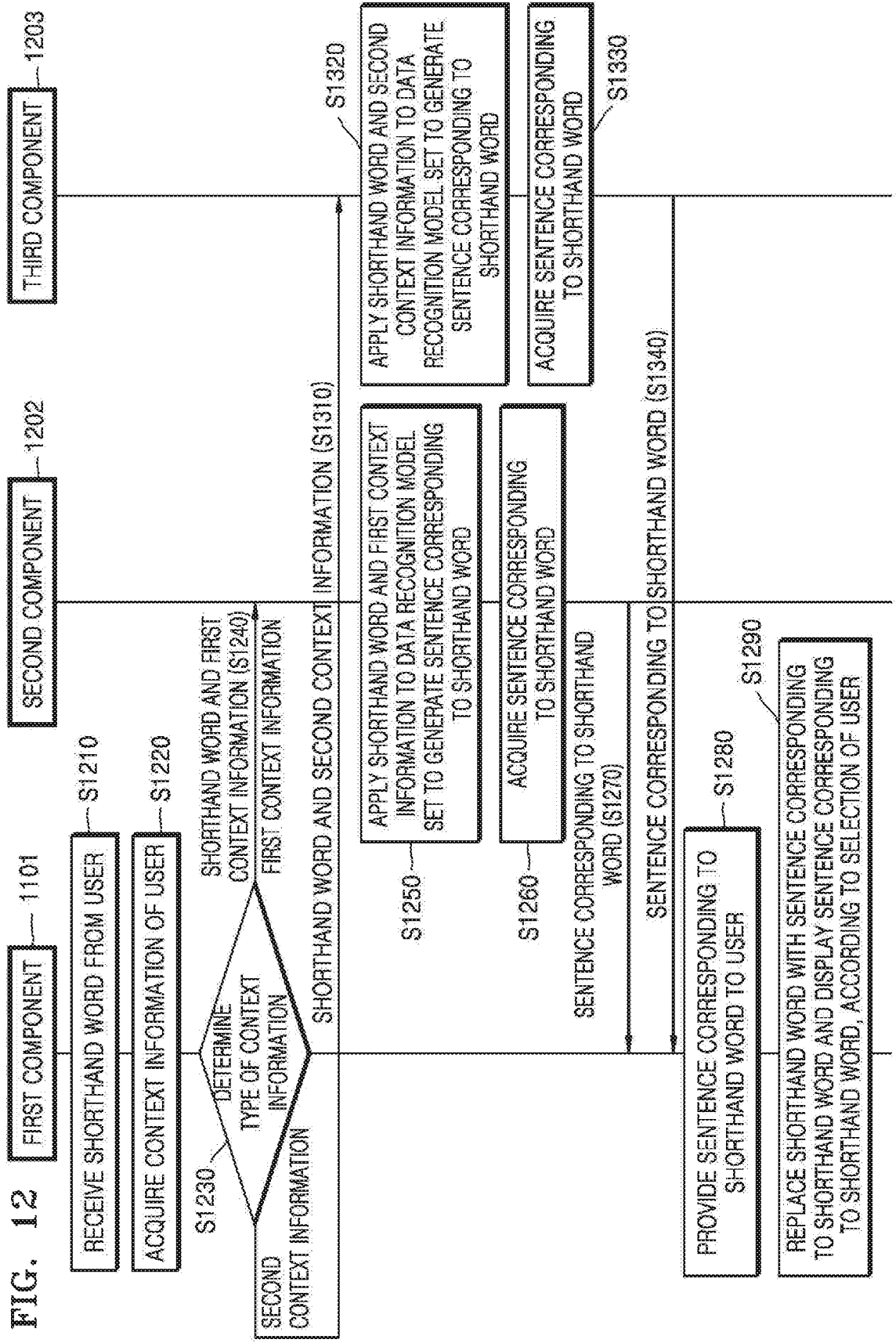

APPARATUS AND METHOD FOR PROVIDING SENTENCE BASED ON USER INPUT

CROSS-REFERENCE TO RELATED APPLICATIONS

This application is based on and claims priority under 35 U.S.C. Section 119 on Korean Patent Application No. 10-2016-0160783, filed on Nov. 29, 2016, and Korean Patent Application No. 10-2017-0144234, filed on Oct. 31, 2017, in the Korean Intellectual Property Office, the disclosures of which are incorporated herein in their entireties by reference.

BACKGROUND

1. Field

The present disclosure relates to an apparatus and/or method for providing a sentence based on a user input.

In addition, the present disclosure relates to an artificial intelligence (AI) system for simulating functions such as recognition and determination of a human brain by using a machine learning algorithm and an application thereof.

2. Description of the Related Art

The recent wide use of mobile devices such as smartphones enables a user to execute various applications in a mobile device and input the user's desired contents in each application. There is a method of assisting the user's input by using a statistical value of the user's past inputs in the mobile device.

In addition, recently, an AI system for implementing the intelligence in the level of a human being has been used in various fields. The AI system is a system in which an AI machine is getting smart through self-learning and determination. The AI system may have an improved recognition rate and accurately understand a user's taste, as the AI system is used.

AI technology includes machine learning (for example, deep learning) and element techniques utilizing the machine learning.

The machine learning is an algorithm technique of classifying/learning characteristics of input data by a machine, and the techniques simulate functions such as recognition and determination of a human brain by using a machine learning algorithm such as deep learning and include technical fields such as linguistic understanding, visual understanding, inference/prediction, knowledge expression, and operation control.

The various fields in which the AI technology is applied are as follows. Linguistic understanding is a technique of recognizing and applying/processing language/character of a human being and includes natural language processing, machine translation, conversation system, question and answer, speech recognition/synthesis, and the like. Visual understanding is a technique of recognizing and processing a matter like vision of a human being and includes object recognition, object tracking, image search, human recognition, scene understanding, space understanding, image enhancement, and the like. Inference/prediction is a technique of determining information to perform logical inference and prediction and includes knowledge/probability-based inference, optimized prediction, preference-based planning, recommendation, and the like. Knowledge expression is a technique of automatically processing experience information of a human being to knowledge data and includes knowledge construction (data generation/classification), knowledge management (data utilization), and the like. Operation control is a technique of controlling autonomous driving of a vehicle and a motion of a robot and includes motion control (navigation, collision, driving), manipulation control (behavior control), and the like.

SUMMARY

Provided are an apparatus and/or method for providing a sentence based on a user input. When a sentence corresponding to a shorthand word input from a user is generated and provided to the user, a sentence most suitable for a current context is provided to the user by further considering context information.

Additional aspects will be set forth in part in the description which follows and, in part, will be apparent from the description, or may be learned by practice of the presented embodiments.

According to a first example aspect of an embodiment, an apparatus for providing a sentence based on a user input includes: a memory configured to store computer-executable instructions; at least one processor configured to execute the computer-executable instructions to analyze a shorthand word input from a user and context information of the user, which has been acquired by the apparatus, and generate a sentence corresponding to the shorthand word based on the shorthand word and the context information; and an input and output interface configured to receive the shorthand word from the user, provide the sentence corresponding to the shorthand word to the user, and replace the shorthand word with the sentence corresponding to the shorthand word and display the sentence corresponding to the shorthand word according to a selection of the user.

According to a second example aspect of another embodiment, a method of providing a sentence based on a user input includes: receiving a shorthand word from a user; acquiring context information of the user; providing a sentence corresponding to the shorthand word to the user based on the shorthand word and the context information, and replacing the shorthand word with the sentence corresponding to the shorthand word and displaying the sentence corresponding to the shorthand word according to a selection of the user.

According to a third example aspect of another embodiment, a non-transitory computer-readable recording medium has recorded thereon a program for executing, in a computer, the method of providing a sentence based on a user input.

BRIEF DESCRIPTION OF THE DRAWINGS

These and/or other aspects, features and/or attendant advantages will become apparent and more readily appreciated from the following description of the embodiments, taken in conjunction with the accompanying drawings in which:

FIGS. 11 and 12 are flowcharts of a network system using a data recognition model, according to an embodiment.

DETAILED DESCRIPTION

Figure 1:
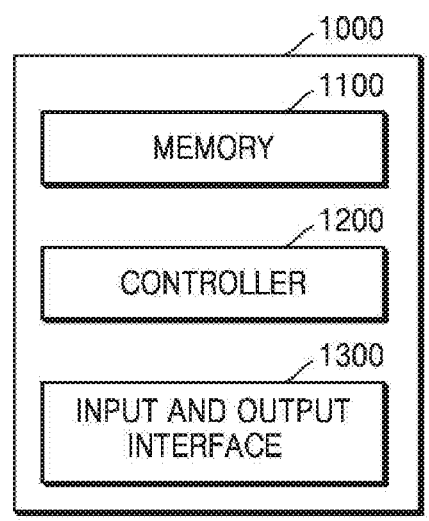
FIG. 1 is a block diagram for describing an apparatus for providing a sentence based on a user input, according to an embodiment.

Hereinafter, example embodiments only for illustration will be described in detail with reference to the accompanying drawings. The example embodiments below are only for embodying technical features but are not limiting with respect to scope. It should be understood that the matters which can be readily inferred by those of ordinary skill in the art from the detailed description and the embodiments, are not necessarily described in detail and are part of the scope of this disclosure.

When it is described that a certain element is "connected" to another element, it should be understood that the certain element may be connected to another element directly or via another element(s) therebetween. In addition, when a certain element "includes" another element, this indicates that the certain element may further include another element instead of excluding another element unless there is different disclosure.

In addition, although terms including an ordinal, such as 'first' or 'second', can be used to describe various elements, the elements cannot be limited by the terms. The terms can be used to classify a certain element from another element.

In the present specification, the term "shorthand word" is a generic term of language in an abbreviated form and may indicate an abbreviation, an acronym, shorthand, or the like.

In the present specification, the term "context information" may indicate information defining a feature of an environment which influences an interaction between a user and another user, a system, or an application in a device. For example, the context information may include information about user context including a profile, a location, acquaintances, and the like of the user. Alternatively, the context information may include information about physical context including lighting, a noise level, a traffic state, a temperature, and the like. Alternatively, the context information may include information about time context including time, week, month, season, and the like. Alternatively, the context information may include information about computing context including a network connection state, a communication bandwidth, and the like, and the like. This context information may be detected through various sensing modules or applications and then used to provide various application services or used for inference for obtaining a third conclusion by being bound with other context information.

In the present specification, "apparatus for providing a sentence based on a user input" indicates a generic term of an apparatus capable of providing a sentence based on a shorthand word input from a user. For example, portable devices such as a smartphone and a laptop computer and stationary devices such as a desktop personal computer (PC) may correspond to an apparatus for providing a sentence based on a user input.

The present example embodiments relate to an apparatus and method for providing a sentence based on a user input, and a detailed description of matters well known to those of ordinary skill in the art to which the embodiments below belong is omitted.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram for describing an apparatus 1000 for providing a sentence based on a user input, according to an example embodiment.

As shown in FIG. 1, the apparatus 1000 according to an example embodiment may include a memory 1100, a controller 1200, and an input and output interface (including input/output circuitry) 1300.

The memory 1100 may store programs for processing and control of the controller 1200 and store data input to the apparatus 1000 and/or output from the apparatus 1000. The memory 1100 may store computer-executable instructions.

The controller 1200 may commonly control a general operation of the apparatus 1000. The controller 1200 may include at least one processor and processing circuitry. The controller 1200 may include a plurality of processors or one integrated processor according to functions or roles thereof.

The at least one processor, including processing circuitry, forming the controller 1200 may execute the computer-executable instructions stored in the memory 1100 to analyze a shorthand word input from a user and context information of the user, which has been acquired by the apparatus 1000, and to generate at least one sentence corresponding to the shorthand word based on the shorthand word and the context information. The at least one processor forming the controller 1200 may generate an optimal sentence with which the shorthand word input from the user is to be replaced.

The at least one processor forming the controller 1200 may generate a sentence corresponding to the shorthand word(s) based on a feature(s) extracted by analyzing the context information and on the shorthand word(s) input from the user. Even though the same shorthand word(s) is input, the at least one processor forming the controller 1200 may generate a different sentence corresponding to the shorthand word according to context information.

The at least one processor forming the controller 1200 may generate a sentence corresponding to a shorthand word(s) by applying the shorthand word(s) and context information of the user to a learned data recognition model. The learned data recognition model may be stored in a server outside the apparatus 1000 and/or received from the server in response to a request of the apparatus 1000.

Context information of the user may be various kinds of data such as information about a counterpart, a type of an application through which a shorthand word(s) is input, the contents of content input before the shorthand word is input, a user input pattern detected from a past user input history, a location of the user, and/or a time when a user input is performed.

The at least one processor forming the controller 1200 may generate a sentence corresponding to a shorthand word(s) based on the shorthand word(s) and a relationship between a counterpart and the user. As another example, the at least one processor forming the controller 1200 may generate a sentence corresponding to a shorthand word(s) based on the shorthand word and a characteristic or function of an application. As another example, the at least one processor forming the controller 1200 may generate a sentence corresponding to a shorthand word(s) based on the shorthand word(s) and the contents of content input before the shorthand word(s) is input. As another example, the at least one processor forming the controller 1200 may generate a sentence corresponding to a shorthand word(s) based on the shorthand word(s) and a user input pattern. The at least one processor forming the controller 1200 may generate a sentence corresponding to a shorthand word(s) based on the shorthand word(s) and a combination of various pieces of content information.

The at least one processor forming the controller 1200 may learn a correlation between a shorthand word (singular or plural) and a sentence based on the sentence corresponding to the shorthand word according to a selection of the user. The at least one processor forming the controller 1200 may use a shorthand word and a sentence corresponding to the shorthand word according to a selection of the user as data for learning of a data recognition model to be used to generate a sentence corresponding to a shorthand word.

The input and output interface 1300 may receive a shorthand word from the user and provide a sentence corresponding to the shorthand word to the user. The input and output interface 1300 may replace the shorthand word with the sentence corresponding to the shorthand word and display the sentence corresponding to the shorthand word, according to a selection of the user. When a plurality of sentences correspond to the shorthand word, the input and output interface 1300 may provide a sentence corresponding to the shorthand word to the user based on priority indicating an optimal sentence with which the shorthand word is to be replaced. When a selectable expression is included in the sentence corresponding to the shorthand word, the input and output interface 1300 may additionally provide a user interface through which the selectable expression is selected.

Figure 2:
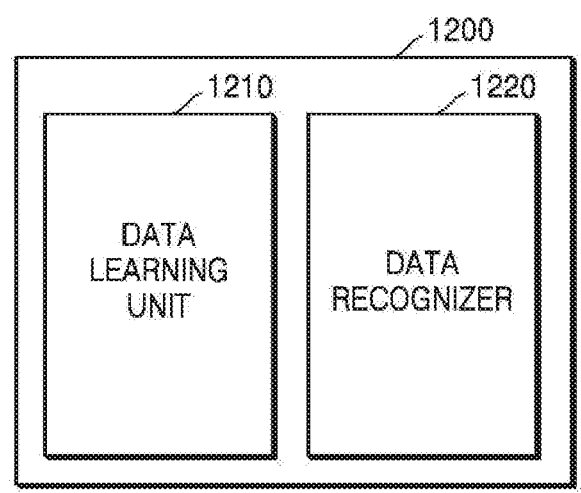
FIG. 2 is a block diagram of a controller according to an embodiment.

FIG. 2 is a block diagram of the controller 1200 according to an example embodiment.

Referring to FIG. 2, the controller 1200 according to an embodiment may include a data learning unit (including data learning circuitry) 1210 and a data recognizer (including data recognizing circuitry) 1220.

The data learning unit 1210 may learn a criterion for generating a sentence corresponding to a shorthand word. The data learning unit 1210 may learn a criterion about which data is to be used and how to generate a sentence by using data, to generate a sentence corresponding to a shorthand word. The data learning unit 1210 may learn a criterion for generating a sentence corresponding to a shorthand word by acquiring data for learning to be used for the learning and applying the acquired data for learning to a data recognition model to be described below.

The data learning unit 1210 may allow the data recognition model to learn by using the data for learning according to a supervised learning method or a non-supervised learning method.

For example, the data learning unit 1210 may use a sentence and context information reflected when the sentence is generated, as the data for learning. The data learning unit 1210 may further use a shorthand word corresponding to the sentence, and in this case, the sentence may be replaced with the shorthand word. The context information may include, for example, one or more of a subject for selecting or generating the sentence, information about a counterpart who reads the sentence, and data corresponding to a correlation between the subject and the counterpart. In addition, the context information may include content before or after the sentence (for example, a text, an image, a video, or a speech). In addition, the context information may include an input pattern detected from a history input in the past by the subject who has generated the sentence, a time when the sentence was generated, a position where the sentence was generated or registered (for example, a type of a social network service (e.g., Facebook or Twitter) or a name of a book in which the sentence is written), evaluation information of the sentence, a comment for the sentence, and information about a counterpart who has generated the comment. In addition, the context information may include information about a style before or after the sentence or a style of the sentence (for example, formal, informal, slang, cultivated language, or jargon).

According to an example embodiment, the context information may be included in a tag of the sentence. In this case, the data learning unit 1210 may select the context information included in the tag and use the selected context information as data for learning. Alternatively, the context information may exist as a separate file. In this case, the data learning unit 1210 may refer to an address (for example, a universal resource locator (URL)) indicated by the sentence and use a file located in the address as data for learning.

The data recognizer 1220 may generate a sentence corresponding to a shorthand word based on various kinds of data. The data recognizer 1220 may generate a sentence corresponding to a shorthand word based on the shorthand word input from the user and context information of the user, by using a learned data recognition model. The data recognizer 1220 may acquire data for recognition, which includes a shorthand word input from the user and context information of the user, according to a criterion preset through learning, and generate (or estimate, infer, or predict) a sentence corresponding to the shorthand word by using the data recognition model in which the acquired data for recognition is an input value.

In this case, the context information of the user who has input the shorthand word may include one or more of information about a counterpart who receives the sentence, a type of an application through which the shorthand word is input, the contents of content input before the shorthand word is input, a user input pattern detected from a past user input history, a location of the user, a time when the input of the user was performed, or the like.

In addition, the sentence corresponding to the shorthand word, which has been generated by using, as an input value of the data recognition model, the data for recognition corresponding to the shorthand word input from the user and the context information of the user may be used to update the data recognition model.

At least one of the data learning unit 1210 and the data recognizer 1220 may be manufactured in a form of at least one hardware chip and equipped in an electronic device. For example, at least one of the data learning unit 1210 and the data recognizer 1220 may be manufactured in a form of exclusive hardware chip for artificial intelligence (AI), or manufactured as a part of an existing general-use processor (for example, a central processing unit (CPU) or an application processor) or a graphic exclusive processor (for example, a graphics processing unit (GPU)) and equipped in various kinds of electronic devices described above. In this case, the exclusive hardware chip for AI is an exclusive processor specified for probability computation and has a higher parallel processing performance than existing general-use processors such that the exclusive hardware chip for AI may more quickly process a computation job of an AI field such as machine learning than the existing general-use processors.

In this case, the data learning unit 1210 and the data recognizer 1220 may be equipped in one electronic device or respectively equipped in individual electronic devices. For example, one of the data learning unit 1210 and the data recognizer 1220 may be included in an electronic device, and the other one may be included in a server. In addition, the data learning unit 1210 and the data recognizer 1220 may be connected in a wired or wireless manner to provide model information constructed by the data learning unit 1210 to the data recognizer 1220 and provide data input to the data recognizer 1220 to the data learning unit 1210 as additional data for learning.

At least one of the data learning unit 1210 and the data recognizer 1220 may be implemented as a software module. When at least one of the data learning unit 1210 and the data recognizer 1220 is implemented as a software module (or a program module including instructions), the software module may be stored in a non-transitory computer-readable recording medium. In addition, in this case, at least one software module may be provided by an operating system (OS) or provided by a certain application. Alternatively a part of the at least one software module may be provided by the OS, and the other part thereof may be provided by the certain application.

Figure 3:
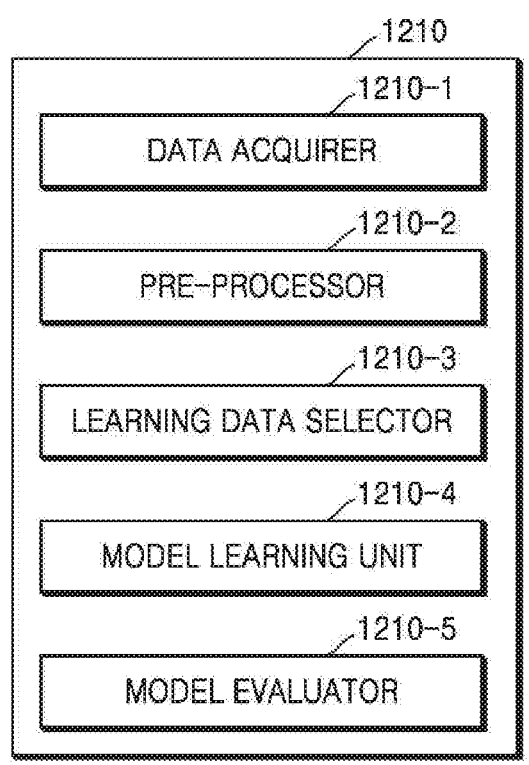
FIG. 3 is a block diagram of a data learning unit according to an embodiment.

FIG. 3 is a block diagram of the data learning unit 1210 according to an example embodiment.

Referring to FIG. 3, the data learning unit 1210 according to some example embodiments may include a data acquirer 1210-1, a pre-processor 1210-2, a learning data selector 1210-3, a model learning unit 1210-4, and a model evaluator 1210-5, each of which may include circuitry for performing the respective function(s). The data learning unit 1210 according to some example embodiments may requisitely include the data acquirer 1210-1 and the model learning unit 1210-4 and selectively further include at least one of, or may not include all of, the pre-processor 1210-2, the learning data selector 1210-3, and the model evaluator 1210-5.

The data acquirer 1210-1 may acquire data required to learn a criterion for generating a sentence corresponding to a shorthand word. The data acquirer 1210-1 may acquire data required for learning to generate a sentence corresponding to a shorthand word.

For example, the data acquirer 1210-1 may acquire image data (for example, an image, or a video), text data, speech data, or the like. For example, the data acquirer 1210-1 may acquire data directly input or selected from the apparatus 1000. Alternatively, the data acquirer 1210-1 may acquire various pieces of sensing information sensed by the apparatus 1000 using various sensors. Alternatively, the data acquirer 1210-1 may acquire data received from an external device such as a server which communicates with the apparatus 1000.

The data acquirer 1210-1 may acquire data input from the user, data pre-stored in the apparatus 1000, data received from an external device such as a server, or the like, but is not limited thereto. The data acquirer 1210-1 may acquire data by combining the data input from the user, the data pre-stored in the apparatus 1000, and/or the data received from the external device such as a server.

The pre-processor 1210-2, including processing circuitry, may pre-process the acquired data such that the acquired data is used to generate a sentence corresponding to a shorthand word. The pre-processor 1210-2 may process the acquired data in a preset format such that the model learning unit 1210-4 to be described below uses the acquired data for learning to determine context.

For example, the pre-processor 1210-2 may cancel noise from the data acquired by the data acquirer 1210-1, such as a text, an image, a video, or a speech, or process the data in a certain format so as to select meaningful data. Alternatively, the pre-processor 1210-2 may process a format of the acquired data to a format of data suitable for learning. The pre-processor 1210-2 may process speech data to text data.

The learning data selector 1210-3 may select data for learning required for learning from among the pre-processed data to generate a sentence corresponding to a shorthand word. The selected data for learning may be provided to the model learning unit 1210-4. The learning data selector 1210-3 may select data for learning required for learning from among the pre-processed data to generate a sentence corresponding to a shorthand word, according to a preset criterion for generating a sentence corresponding to a shorthand word. The preset criterion may include at least one of, for example, an attribute of data, a generation time of the data, a generator of the data, reliability of the data, a target of the data, a generation region of the data, and a size of the data.

Alternatively, the learning data selector 1210-3 may select data for learning according to a criterion preset by learning in the model learning unit 1210-4 to be described below.

The learning data selector 1210-3 may have a criterion for selecting data for each data type such as text, image, video, or speech and select data for learning required for learning by using this criterion.

The learning data selector 1210-3 may select data for learning which sentence is generated from which shorthand word. In addition, the learning data selector 1210-3 may select data to learn which context information has been used to generate a certain sentence from a certain shorthand word. The learning data selector 1210-3 may select various types of data corresponding to a shorthand word, a sentence replacing the shorthand word, and context information reflected when the sentence replacing the shorthand word is generated.

For example, the learning data selector 1210-3 may select data corresponding to a subject for inputting a shorthand word and selecting or generating a sentence replacing the shorthand word, information about a counterpart, and a relationship between the subject and the counterpart. Alternatively, the learning data selector 1210-3 may select data indicating a type of an executed application. For example, the learning data selector 1210-3 may include data indicating a type of an application through which a shorthand word or a sentence is provided or received. Alternatively, the learning data selector 1210-3 may select data such as content (for example, a text, an image, a video, or a speech) before or after a shorthand word or a sentence replacing the shorthand word. Alternatively, the learning data selector 1210-3 may select data related to a location of the user or a time when a user input is performed. Alternatively, the learning data selector 1210-3 may include a time when a shorthand word or a sentence was generated, a position where the shorthand word or the sentence was generated or registered, evaluation information of the shorthand word or the sentence, a comment for the shorthand word or the sentence, and information about a counterpart who has generated the comment. Alternatively, the learning data selector 1210-3 may include information about a style of a shorthand word or a sentence.

Alternatively, the learning data selector 1210-3 may select data related to a past user input history. For example, the learning data selector 1210-3 may select data related to a past input history of a subject who has generated a shorthand word or a sentence.

The model learning unit 1210-4 may learn, based on data for learning, a criterion for generating a sentence corresponding to a shorthand word. In addition, the model learning unit 1210-4 may learn a criterion of which data for learning is to be used to generate a sentence corresponding to a shorthand word.

The model learning unit 1210-4 may learn, based on a shorthand word and context information of the user, how to generate a sentence corresponding to the shorthand word. For example, the model learning unit 1210-4 may learn one or more of which words or phrases include the shorthand word, whether a counterpart is a specified counterpart or unspecified individuals, what is influenced to a generated sentence due to a relationship between the counterpart and the user. In addition, the model learning unit 1210-4 may learn what a function and/or characteristic of an executed application influences to generate a sentence corresponding to a shorthand word, according to whether the application is a chat application, a message or email application, or a social networking service (SNS) application. In addition, the model learning unit 1210-4 may learn a correlation between a shorthand word and a sentence corresponding to the shorthand word from data such as a text, an image, a video, a speech before or after the sentence replacing the shorthand word. In addition, the model learning unit 1210-4 may learn whether a location of the user or an input time of the user operates as significant context information to generate a sentence corresponding to a shorthand word. In addition, the model learning unit 1210-4 may learn whether a comment or evaluation information of a sentence operates as significant context information to generate a sentence corresponding to a shorthand word. In addition, the model learning unit 1210-4 may learn an input pattern of the user from data related to a past user input history.

When different sentences are generated in correspondence to the same shorthand word, the model learning unit 1210-4 may learn what is significant context information which may correspond to a cause.

In addition, the model learning unit 1210-4 may allow a data recognition model, which is to be used to generate a sentence corresponding to a shorthand word, to learn by using data for learning. In this case, the data recognition model may be a pre-constructed model. For example, the data recognition model may be a model pre-constructed by receiving basic data for learning (e.g., sample data). The data recognition model may be set to generate (or estimate, infer, or predict) a sentence corresponding to a shorthand word based on the shorthand word and context information.

The data recognition model may be constructed by considering an application filed of the data recognition model, a purpose of learning, a computing performance of a device, or the like. The data recognition model may be, for example, a model based on a neural network. The data recognition model may be designed to simulate a human brain structure in a computer. The data recognition model may include a plurality of network nodes having weights, which simulate neurons of a human neural network. The plurality of network nodes may form connection relationships such that each connection relationship simulates a synaptic activity of a neuron which transmits and receives a signal through a synapse. The data recognition model may include, for example, a neural network model, or a deep learning model developed from the neural network model. In the deep learning model, a plurality of network nodes may be located at different depths (or layers) and transmit and receive data according to a convolution connection relationship. For example, a model such as a deep neural network (DNN), a recurrent neural network (RNN), or a bidirectional recurrent deep neural network (BRDNN) may be used as the data recognition model but is not limited thereto.

According to some example embodiments, when there exist a plurality of pre-constructed data recognition models, the model learning unit 1210-4 may determine, as a data recognition model to be learned, a data recognition model having a high relationship between input data for learning and basic data for learning. In this case, the basic data for learning may be pre-classified for each data type, and the data recognition models may be pre-classified for each data type. For example, the basic data for learning may be pre-classified based on various criteria such as a generation region of data for learning, a generation time of the data for learning, a size of the data for learning, a genre of the data for learning, a generator of the data for learning, and a type of an object in the data for learning.

Alternatively, the model learning unit 1210-4 may allow the data recognition model to learn by using, for example, a learning algorithm including error back-propagation or gradient descent.

Alternatively, the model learning unit 1210-4 may allow the data recognition model to learn through, for example, supervised learning of which an input value is data for learning. Alternatively, the model learning unit 1210-4 may allow the data recognition model to learn through, for example, unsupervised learning by which a criterion for generating a sentence corresponding to a shorthand word by learning, by the model learning unit 1210-4, a type of data required to generate a sentence corresponding to a shorthand word without a separate supervision. Alternatively, the model learning unit 1210-4 may allow the data recognition model to learn through, for example, reinforcement learning using a feedback on whether a result of generating a sentence corresponding to a shorthand word according to learning is right.

In addition, the model learning unit 1210-4 may generate a plurality of data recognition models set to generate a sentence corresponding to a shorthand word by considering context information. For example, the model learning unit 1210-4 may generate a plurality of data recognition models identified according to a style of a sentence, a type of an application through the sentence is provided, a counterpart who reads the sentence, and a position where the sentence is generated.

When the data recognition model is learned, the model learning unit 1210-4 may store the learned data recognition model. In this embodiment, the model learning unit 1210-4 may store the learned data recognition model in a memory of an electronic device including the data recognizer 1220. Alternatively, the model learning unit 1210-4 may store the learned data recognition model in a memory of a server connected to an electronic device through a wired or wireless network.

In this example embodiment, a memory in which the learned data recognition model is stored may also store, for example, a command or data related to at least one other component of an electronic device. In addition, the memory may store software and/or programs. The programs may include, for example, a kernel, middleware, an application programming interface (API) and/or application programs (or "applications").

The model evaluator 1210-5 may input evaluation data to the data recognition model, and if a recognition result output from the data recognition model does not satisfy a certain criterion, the model evaluator 1210-5 may allow the model learning unit 1210-4 to perform learning again. In this case, the evaluation data may be preset data for evaluating the data recognition model.

For example, when a number or percentage of pieces of evaluation data of which a recognition result is not correct among recognition results of the learned data recognition model for the evaluation data exceeds a preset threshold, the model evaluator 1210-5 may evaluate that the certain criterion is not satisfied. For example, when the certain criterion is defined as 2%, if the learned data recognition model outputs wrong recognition results for more than 20 pieces of evaluation data among a total of 1000 pieces of evaluation data, the model evaluator 1210-5 may evaluate that the learned data recognition model is not suitable.

When there exist a plurality of learned data recognition models, the model evaluator 1210-5 may evaluate whether each learned data recognition model satisfies the certain criterion and determine a model satisfying the certain criterion as a final data recognition model. In this case, when a plurality of models satisfy the certain criterion, the model evaluator 1210-5 may determine, as the final data recognition model, any one model or a certain number of models preset in an order of higher evaluation score.

At least one of the data acquirer 1210-1, the pre-processor 1210-2, the learning data selector 1210-3, the model learning unit 1210-4, and the model evaluator 1210-5 in the data learning unit 1210 may be manufactured in a form of at least one hardware chip and equipped in an electronic device. For example, at least one of the data acquirer 1210-1, the pre-processor 1210-2, the learning data selector 1210-3, the model learning unit 1210-4, and the model evaluator 1210-5 may be manufactured in a form of exclusive hardware chip for an AI, or manufactured as a part of an existing general-use processor (e.g., a CPU or an application processor) or a graphic exclusive processor (e.g., a GPU) and may be equipped in various types of electronic devices described above.

In addition, the data acquirer 1210-1, the pre-processor 1210-2, the learning data selector 1210-3, the model learning unit 1210-4, and the model evaluator 1210-5 may be equipped in one electronic device or respectively equipped in individual electronic devices. For example, some of the data acquirer 1210-1, the pre-processor 1210-2, the learning data selector 1210-3, the model learning unit 1210-4, and the model evaluator 1210-5 may be included in an electronic device, and the other some may be included in a server.

Alternatively, at least one of the data acquirer 1210-1, the pre-processor 1210-2, the learning data selector 1210-3, the model learning unit 1210-4, and the model evaluator 1210-5 may be implemented as a software module. When at least one of the data acquirer 1210-1, the pre-processor 1210-2, the learning data selector 1210-3, the model learning unit 1210-4, and the model evaluator 1210-5 is implemented as a software module (or a program module including instructions), the software module may be stored in a non-transitory computer-readable recording medium. In addition, in this case, at least one software module may be provided by an OS or a certain application. Alternatively, a part of the at least one software module may be provided by the OS, and the other part may be provided by the certain application.

Figure 4:
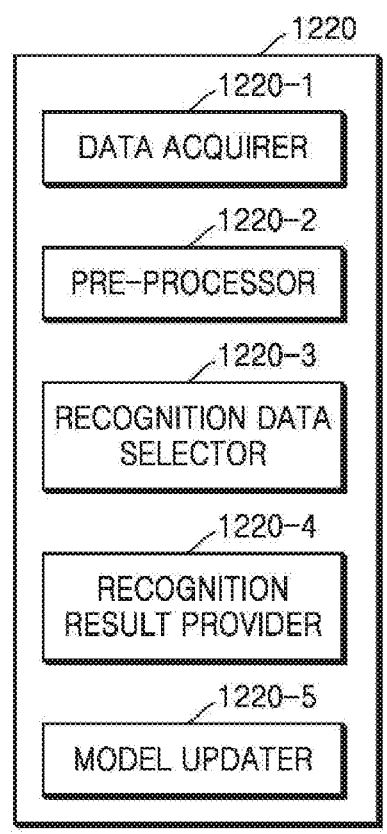
FIG. 4 is a block diagram of a data recognizer according to an embodiment.

FIG. 4 is a block diagram of the data recognizer 1220 according to an example embodiment.

Referring to FIG. 4, the data recognizer 1220 according to some example embodiments may include a data acquirer 1220-1, a pre-processor 1220-2, a recognition data selector 1220-3, a recognition result provider 1220-4, and a model updater 1220-5, each of which may include circuitry for performing the respective functions. The data recognizer 1220 according to some embodiments may requisitely include the data acquirer 1220-1 and the recognition result provider 1220-4 and may further selectively include at least one of the pre-processor 1220-2, the recognition data selector 1220-3, and the model updater 1220-5.

The data acquirer 1220-1 may generate a sentence corresponding to a shorthand word input from the user based on the shorthand word and context information of the user by using a learned data recognition model.

The data acquirer 1220-1 may acquire various types of data required to generate a sentence corresponding to a shorthand word. For example, the data acquirer 1220-1 may acquire image data, text data, speech data, or the like. For example, the data acquirer 1220-1 may acquire data directly input or selected from the apparatus 1000 or acquire various pieces of sensing information sensed by the apparatus 1000 using various sensors. Alternatively, the data acquirer 1220-1 may acquire data received from an external device such as a server which communicates with the apparatus 1000. For example, the data acquirer 1220-1 may acquire a shorthand word input from the user in order to generate a sentence corresponding to the shorthand word.

The pre-processor 1220-2, including processing circuitry, may pre-process the acquired data such that the data required to generate a sentence corresponding to a shorthand word. The pre-processor 1220-2 may process the acquired data in a preset format such that the recognition result provider 1220-4 to be described below uses the data acquired to generate a sentence corresponding to a shorthand word.

For example, the pre-processor 1220-2 may cancel noise from the data acquired by the data acquirer 1220-1, such as a text, an image, a video, or a speech, or process the data in a certain format so as to select meaningful data. Alternatively, the pre-processor 1220-2 may process a format of the acquired data to a format of data suitable for learning. The pre-processor 1220-2 may process speech data to text data.

The recognition data selector 1220-3 may select, from among the pre-processed data, data for recognition required to generate a sentence corresponding to a shorthand word. The selected data for recognition may be provided to the recognition result provider 1220-4. The recognition data selector 1220-3 may select a part or all of the pre-processed data according to a preset criterion for generating a sentence corresponding to a shorthand word. Alternatively, the recognition data selector 1220-3 may select data according to a criterion preset by learning in the model learning unit 1210-4 described above. The preset criterion may include at least one of, for example, an attribute of data, a generation time of the data, a generator of the data, reliability of the data, a target of the data, a generation region of the data, and a size of the data.

For example, the recognition data selector 1220-3 may select data corresponding to a subject for inputting a shorthand word and selecting or generating a sentence replacing the shorthand word, information about a counterpart, and a relationship between the subject and the counterpart. Alternatively, the recognition data selector 1220-3 may select data indicating a type of an executed application (for example, an application which receives a shorthand word). Alternatively, the recognition data selector 1220-3 may select data of such as content (for example, a text, an image, a video, or a speech) before and/or after a shorthand word or a sentence replacing the shorthand word. Alternatively, the recognition data selector 1220-3 may select data related to a location of the user and/or a time when a user input is performed. Alternatively, the recognition data selector 1220-3 may select data related to a past user input history. At least one piece of the data selected by the recognition data selector 1220-3 may be used as context information when a sentence corresponding to a shorthand word is generated.

The recognition result provider 1220-4 may generate (or estimate, infer, or predict) a sentence corresponding to a shorthand word by applying the selected data to a data recognition model. The recognition result provider 1220-4 may provide a sentence corresponding to a shorthand word according to a recognition purpose. The recognition result provider 1220-4 may apply the selected data to the data recognition model by using the data selected by the recognition data selector 1220-3 as an input value. In addition, the recognition result may be determined by the data recognition model. The recognition result provider 1220-4 may generate a sentence corresponding to a shorthand word based on the shorthand word and context information of the user.

The recognition result provider 1220-4 may generate a sentence corresponding to a shorthand word by checking which words, phrases, or sentences include the shorthand word and considering a relationship between a counterpart and the user on whether the counterpart is a specified counterpart or unspecified individuals. For example, the recognition result provider 1220-4 may check all words, phrases, or sentences which may correspond to a shorthand word input from the user. In addition, when a counterpart is a specified counterpart, the recognition result provider 1220-4 may reflect an expression such as a speech tone or honorific when a sentence is generated, according to a relationship between the counterpart and the user. When a sentence is to be provided to unspecified individuals instead of a specified counterpart, the recognition result provider 1220-4 may generate a sentence corresponding to a shorthand word based on a usual input pattern of the user.

Alternatively, the recognition result provider 1220-4 may reflect a characteristic or function of an executed application to generate a sentence corresponding to a shorthand word, according to whether the application is a chat application, a message or email application, or an SNS application. For example, when an application through which a user input is performed is a chat application, the recognition result provider 1220-4 may generate a sentence corresponding to a shorthand word, which matches a context of chat contents or a chat subject. When a sentence corresponding to a shorthand word is generated, the recognition result provider 1220-4 may focus on automatic completion of a reply in response to a sentence input from a counterpart immediately before the shorthand word is input. As another example, when an application through which a user input is performed is a message or email application, the recognition result provider 1220-4 may generate a sentence corresponding to a shorthand word based on the contents and/or a content field commonly appearing in a history of messages and/or mails previously given to and/or taken from a counterpart. As another example, when an application through which a user input is performed is an SNS application, the recognition result provider 1220-4 may generate a sentence corresponding to a shorthand word based on words or a speech tone used only in a certain SNS.

Alternatively, the recognition result provider 1220-4 may generate a sentence corresponding to a shorthand word based on the contents of content input before the shorthand word is input. The recognition result provider 1220-4 may generate a sentence corresponding to a shorthand word based on data such as a text, an image, a video, or a speech before the shorthand word is input. For example, the recognition result provider 1220-4 may extract a word or phrase which may have the same type of shorthand word as input from the user from a text before the shorthand word is input. Alternatively, the recognition result provider 1220-4 may generate a sentence corresponding to a shorthand word based on information about an object included in an image or a video. Alternatively, the recognition result provider 1220-4 may generate a sentence corresponding to a shorthand word based on a text converted from speech data or information about the speech data.

Alternatively, the recognition result provider 1220-4 may generate a sentence corresponding to a shorthand word based on data about a location of the user and/or a time when a user input is performed. For example, the recognition result provider 1220-4 may generate a sentence corresponding to a shorthand word based on a location of the user, which has been acquired by the apparatus 1000, and/or a time when a user input is performed.

Alternatively, the recognition result provider 1220-4 may generate a sentence corresponding to a shorthand word based on data about a past user input history. For example, the recognition result provider 1220-4 may generate a sentence corresponding to a shorthand word based on the user's input pattern such as a sentence construction habit or an expression having a high frequency, which has been detected from a past user input history.

When a plurality of sentences corresponding to a shorthand word are generated by the recognition result provider 1220-4, the recognition result provider 1220-4 may also provide priority indicating an optimal sentence with which the shorthand word is to be replaced. In this case, a sentence having the highest priority may be provided to the user as a sentence corresponding to the shorthand word. Alternatively, the plurality of sentences may be sorted according to the priority and provided to the user.

The recognition result provider 1220-4 may generate different sentences according to context information with respect to the same shorthand word.

For example, when a chat topic as context information is a topic related to a restaurant, and it is determined that a shorthand word input from the user is "ㅇㅌㄹㅇ ㅊㅇㅈ", the recognition result provider 1220-4 may generate a sentence "이탈리안 식당 찾아줘" [search for an Italian restaurant] as a sentence corresponding to the shorthand word. As another example, when a chat topic as context information is a topic related to a house, and it is determined that a shorthand word input from the user is "ㅇㅌㄹㅇ ㅊㅇㅈ", the recognition result provider 1220-4 may generate a sentence "인테리어 업체 찾아줘" [search for an interior design company] as a sentence corresponding to the shorthand word. Thus, the shorthand word and resulting sentence may be in any language, or combination of languages.

The model updater 1220-5 may update the data recognition model based on an evaluation on the recognition result provided by the recognition result provider 1220-4. For example, the model updater 1220-5 may allow the model learning unit 1210-4 to update the data recognition model by providing a sentence corresponding to a shorthand word, which has been provided from the recognition result provider 1220-4, to the model learning unit 1210-4. The model updater 1220-5 may provide, to the model learning unit 1210-4, various pieces of data corresponding to context information, which has been used to generate the sentence corresponding to the shorthand word in the recognition result provider 1220-4, and the shorthand word together with the sentence corresponding to the shorthand word. In this case, the sentence corresponding to the shorthand word may be a sentence selected by the user as a feedback of the user. For example, when a plurality of sentences are provided by the recognition result provider 1220-4, the plurality of sentences may be sorted according to priority and provided to the user. In this case, the model updater 1220-5 may provide, to the model learning unit 1210-4, a sentence selected by the user from among the plurality of sentences, a shorthand word corresponding to the sentence, and data corresponding to context information used when the sentence is generated. Alternatively, when a selectable expression is included in the sentence provided from the recognition result provider 1220-4, a user interface through which the selectable expression is selectable from among a plurality of expressions may be provided to the user. In this case, the model updater 1220-5 may provide, to the model learning unit 1210-4, a sentence including the expression selected by the user, a shorthand word corresponding to the sentence, and data corresponding to context information used when the sentence is generated.

At least one of the data acquirer 1220-1, the pre-processor 1220-2, the recognition data selector 1220-3, the recognition result provider 1220-4, and the model updater 1220-5 in the data recognizer 1220 may be manufactured in a form of at least one hardware chip and equipped in an electronic device. For example, at least one of the data acquirer 1220-1, the pre-processor 1220-2, the recognition data selector 1220-3, the recognition result provider 1220-4, and the model updater 1220-5 may be manufactured in a form of exclusive hardware chip for an AI, or manufactured as a part of an existing general-use processor (e.g., a CPU or an application processor) or a graphic exclusive processor (e.g., a GPU) and may be equipped in various types of electronic devices described above.

In addition, the data acquirer 1220-1, the pre-processor 1220-2, the recognition data selector 1220-3, the recognition result provider 1220-4, and the model updater 1220-5 may be equipped in one electronic device or respectively equipped in individual electronic devices. For example, some of the data acquirer 1220-1, the pre-processor 1220-2, the recognition data selector 1220-3, the recognition result provider 1220-4, and the model updater 1220-5 may be included in an electronic device, and the other some may be included in a server.

Alternatively, at least one of the data acquirer 1220-1, the pre-processor 1220-2, the recognition data selector 1220-3, the recognition result provider 1220-4, and the model updater 1220-5 may be implemented as a software module. When at least one of the data acquirer 1220-1, the pre-processor 1220-2, the recognition data selector 1220-3, the recognition result provider 1220-4, and the model updater 1220-5 is implemented as a software module (or a program module including instructions), the software module may be stored in a non-transitory computer-readable recording medium. In addition, in this case, at least one software module may be provided by an OS or a certain application. Alternatively, a part of the at least one software module may be provided by the OS, and the other part may be provided by the certain application.

Figure 5:
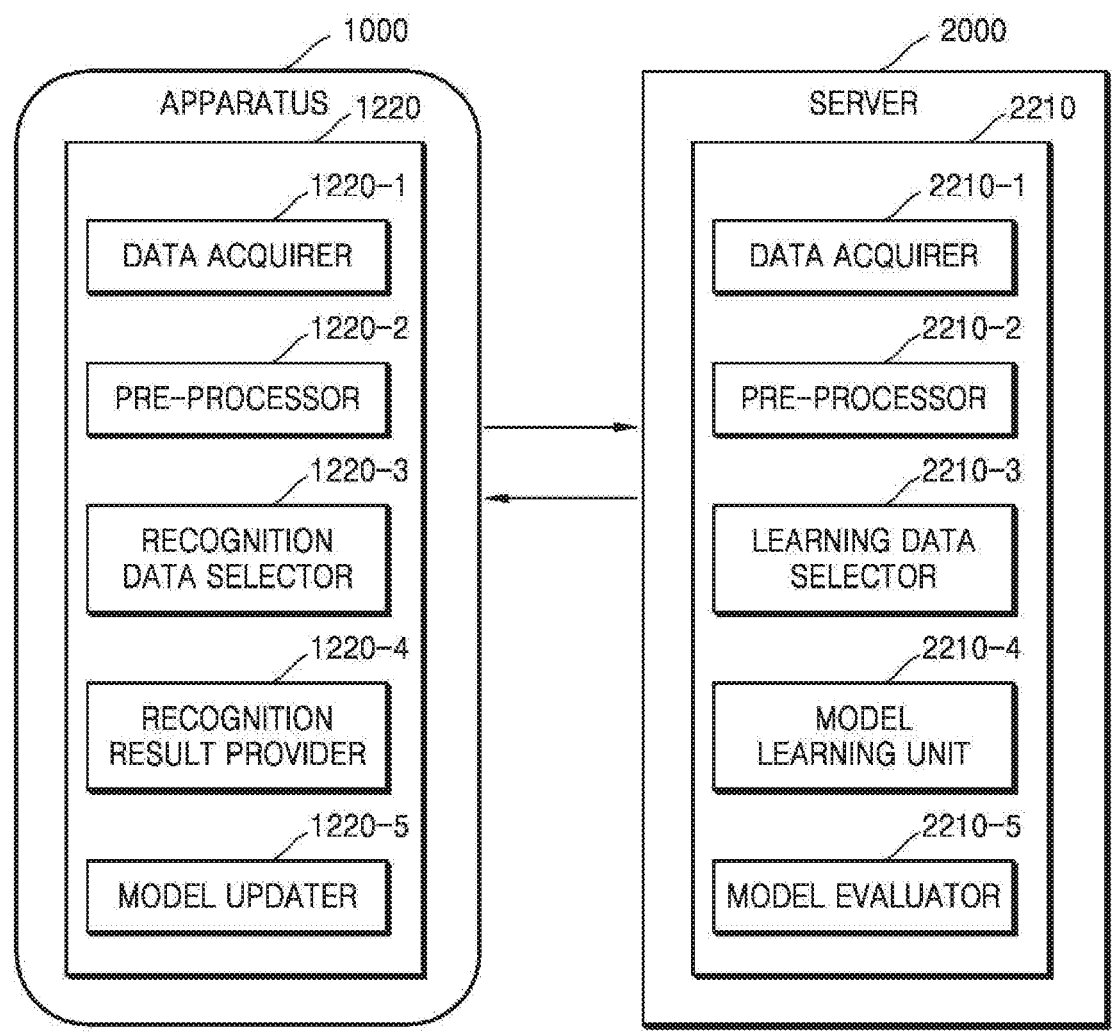
FIG. 5 is a block diagram illustrating an example of learning and recognizing data through interoperating between an apparatus for providing a sentence based on a user input and a server, according to an embodiment.

FIG. 5 is a block diagram illustrating an example of learning and recognizing data through interoperating between the apparatus 1000 and a server 2000, according to an example embodiment.

The data recognizer 1220 of the apparatus 1000 may correspond to the data recognizer 1220 in FIG. 4. In addition, the data acquirer 1220-1, the pre-processor 1220-2, the recognition data selector 1220-3, the recognition result provider 1220-4, and the model updater 1220-5 of the apparatus 1000 may respectively correspond to the data acquirer 1220-1, the pre-processor 1220-2, the recognition data selector 1220-3, the recognition result provider 1220-4, and the model updater 1220-5 included in the data recognizer 1220 in FIG. 4. The data learning unit 2210 may correspond to the data learning unit 1210 of FIGS. 2-3. In addition, a data acquirer 2210-1, a pre-processor 2210-2, a learning data selector 2210-3, a model learning unit 2210-4, and a model evaluator 2210-5 included in a data learning unit 2210 of the server 2000 may respectively correspond to the data acquirer 1210-1, the pre-processor 1210-2, the learning data selector 1210-3, the model learning unit 1210-4, and the model evaluator 1210-5 of the data learning unit 1210 in FIG. 3.

The apparatus 1000 may be connected to the server 2000 through short-range communication or far-distance communication. The mutual connection of the apparatus 1000 and the server 2000 may indicate that the apparatus 1000 is connected to the server 2000 directly or through another component (for example, at least one of an access point (AP), a hub, a relay, a base station, a router, and a gateway as a third component).

Referring to FIG. 5, the server 2000 may learn a criterion for generating a sentence corresponding to a shorthand word, and the apparatus 1000 may generate a sentence corresponding to a shorthand word input from the user, based on the shorthand word and context information of the user, by using a data recognition model learned in the server 2000.

In an example embodiment, the data learning unit 2210 of the server 2000 may perform the function of the data learning unit 1210 shown in FIG. 3. The data learning unit 2210 of the server 2000 may learn a criterion for which data is to be used to generate a sentence corresponding to a shorthand word and how to generate a sentence by using the data. The data learning unit 2210 of the server 2000 may acquire data to be used for the learning, and learn a criterion for generating a sentence corresponding to a shorthand word by applying the acquired data to a data recognition model to be described below. For example, the data learning unit 2210 may generate a data recognition model set to generate a sentence corresponding to a shorthand word by using the shorthand word, the sentence corresponding to the shorthand word, and context information.

In addition, the recognition result provider 1220-4 of the apparatus 1000 may generate a sentence corresponding to a shorthand word by applying data selected by the recognition data selector 1220-3 to a data recognition model generated by the server 2000. For example, the recognition result provider 1220-4 may transmit the data selected by the recognition data selector 1220-3 to the server 2000 and request the server 2000 to generate a sentence corresponding to a shorthand word by applying the data selected by the recognition data selector 1220-3 to the data recognition model. In addition, the recognition result provider 1220-4 may receive, from the server 2000, a sentence corresponding to a shorthand word, which has been generated by the server.

For example, the apparatus 1000 may transmit a shorthand word input from the user and context information of the user, which has been acquired by the apparatus 1000, to the server 2000. The server 2000 may generate a sentence corresponding to the shorthand word by applying the shorthand word and the context information, which have been received from the apparatus 1000, to a data recognition model stored in the server 2000. The server 2000 may generate a sentence corresponding to the shorthand word by further reflecting context information of the user, which has been acquired by the server 2000. The sentence corresponding to the shorthand word, which has been generated by the server 2000, may be transmitted to the apparatus 1000.

Alternatively, the recognition result provider 1220-4 of the apparatus 1000 may receive the data recognition model generated by the server 2000 from the server 2000, and generate a sentence corresponding to a shorthand word by using the received data recognition model. The recognition result provider 1220-4 of the apparatus 1000 may generate a sentence corresponding to a shorthand word by applying the data selected by the recognition data selector 1220-3 to the data recognition model received from the server 2000.

The apparatus 1000 may generate a sentence corresponding to a shorthand word input from the user by applying the shorthand word and context information of the user, which has been acquired by the apparatus 1000, to the data recognition model received from the server 2000. The server 2000 may transmit context information of the user, which has been acquired by the server 2000, to the apparatus 1000 such that the apparatus 1000 further uses the context information of the user, which has been acquired by the server 2000, to generate a sentence corresponding to a shorthand word. For example, the apparatus 1000 may receive a generated data recognition model from the server 2000 and store the received data recognition model in the memory 1100. The apparatus 1000 may receive, from the server 2000, a data recognition model updated periodically or aperiodically (for example, in a case of a request of the apparatus 1000). In this case, the recognition result provider 1220-4 of the apparatus 1000 may generate a sentence corresponding to a shorthand word by applying the data selected by the recognition data selector 1220-3 to the data recognition model stored in the memory 1100.

Figure 6:
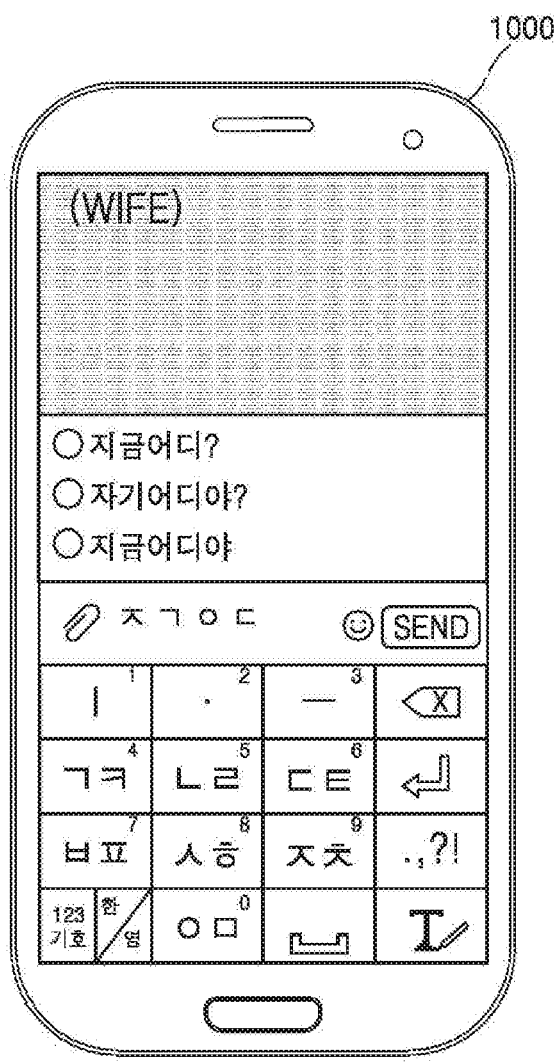
FIG. 6 illustrates a process of providing a sentence corresponding to a shorthand word in an apparatus for providing a sentence based on a user input, according to an embodiment.

FIG. 6 illustrates a process of providing a sentence corresponding to a shorthand word in the apparatus 1000, according to an example embodiment.

When a user-inputtable application is executed in the apparatus 1000, as shown in FIG. 6, a user interface for a user input may be provided. The user-inputtable application may be a chat application, an email application, a message application, an SNS application, a community application, or the like. The user interface for a user input may include an input window and a keyboard, and FIG. 6 shows a Korean alphabet keyboard.

For Korean, the user may input only consonants corresponding to an initial sound of each character as a shorthand word of a sentence which the user desires to write. In this case, the apparatus 1000 may provide a keyboard having only consonants to increase user convenience. As shown in FIG. 6, the user may input a shorthand word consisting of consonants "ㅈㄱㅇㄷ".

The apparatus 1000 may acquire context information of the user before or after the shorthand word is input from the user. For example, when the user executes a user-inputtable application in the apparatus 1000 and selects a counterpart or executes a certain function, the apparatus 1000 may acquire context information of the user even before the shorthand word is input. As another example, the apparatus 1000 may acquire context information after the shorthand word is input.

When the context information is information about the counterpart, the apparatus 1000 may check whether the counterpart is a specified person or unspecified individual(s), and if the counterpart is a specified person, the apparatus 1000 may detect a relationship between the counterpart and the user from various pieces of information such as name, nickname, age, and gender. For example, in FIG. 6, since a name of the counterpart is stored as "wife", the apparatus 1000 may detect that the counterpart and the user are a married couple.

When the context information is a type of an application through which a shorthand word is input, the apparatus 1000 may check the executed application to detect a characteristic or function of the executed application. For example, by confirming that the executed application in FIG. 6 is a chat application, the apparatus 1000 may detect that the chat application has a characteristic of transmitting and receiving various pieces of content including a message and/or has various functions for content transmission and reception.

When the context information is the contents of content input before the shorthand word is input, the apparatus 1000 may check what kinds of content has been input before the shorthand word is input, to detect the contents of the content input before the shorthand word is input. For example, in FIG. 6, if there exist pieces of content input before the shorthand word is input, the apparatus 1000 may detect pieces of content previously transmitted to and/or received from wife who is the counterpart, pieces of content input for recent one week, a subject repetitively appearing in chats, and the like.

When the context information is a user input pattern detected from a past user input history, the apparatus 1000 may check the user's input habits before the shorthand word is input, to detect the user's input pattern such as a sentence configuration habit or expressions having a high frequency. For example, from the user's past user inputs, the apparatus 1000 may detect whether the user has a habit of not inputting a full sentence or not using a symbol or the like in a sentence and detect whether a certain word is included in most sentences.

The apparatus 1000 may provide a sentence corresponding to the shorthand word to the user based on the shorthand word and the context information. According to the example shown in FIG. 6, the apparatus 1000 may generate a sentence corresponding to the shorthand word "ㅈㄱㅇㄷ" based on the facts that the shorthand word input from the user is "ㅈㄱㅇㄷ", the counterpart is wife, and the chat application is being executed, the latest chat subject or chat atmosphere from past chat contents transmitted to and received from wife through the chat application, and a used speech tone. The apparatus 1000 may provide, to the user, a sentence corresponding to the shorthand word, which is generated from a learned data recognition model by using the shorthand word and the context information of the user as input values of the learned data recognition model.

As shown in FIG. 6, the apparatus 1000 may provide sentences such as "지금어디?", "자기어디야?", and "지금어디야" to the user in response to the shorthand word "ㅈㄱㅇㄷ". When a plurality of sentences correspond to the shorthand word, apparatus 1000 may provide the sentences corresponding to the shorthand word to the user based on priority indicating an optimal sentence with which the shorthand word is to be replaced. The apparatus 1000 may provide the sentences to the user in order by arranging a sentence having the highest priority to the top or provide only sentences corresponding to certain priorities to the user.

The apparatus 1000 may replace the shorthand word with a sentence corresponding to the shorthand word and display the sentence, according to a selection of the user. The user may select a desired sentence from at least one displayed sentence corresponding to the shorthand word to replace the shorthand word input from the user with the selected sentence. As shown in FIG. 6, when the apparatus 1000 provides sentences such as "지금어디?", "자기어디야?", and "지금어디야" in response to the shorthand word "ㅈㄱㅇㄷ", the user may select a desired sentence from among the sentences such that the apparatus 1000 replaces the shorthand word "ㅈㄱㅇㄷ" input from the user with the selected sentence and displays the selected sentence.

Figure 7:
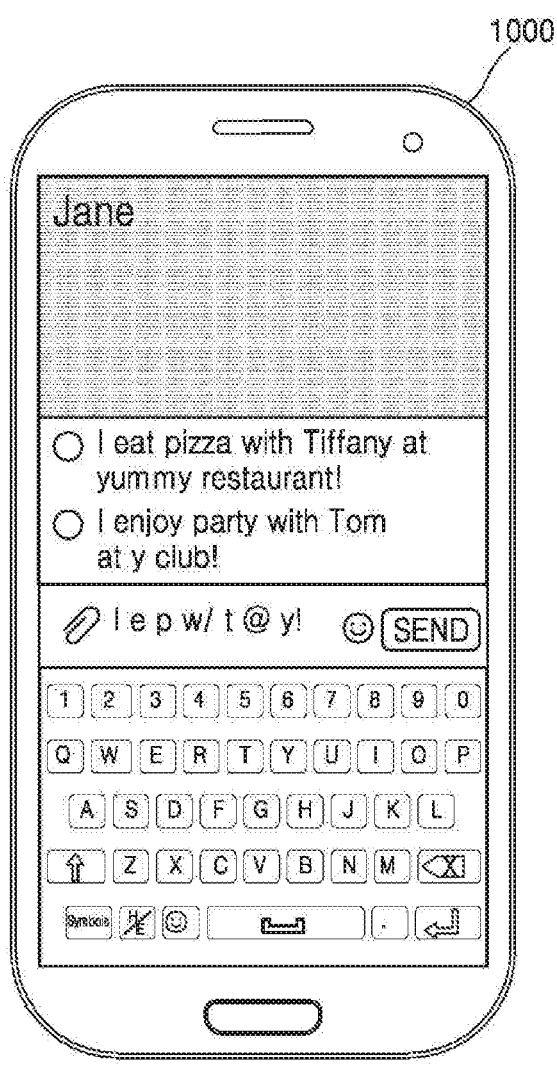
FIG. 7 illustrates a process of providing a sentence corresponding to a shorthand word in an apparatus for providing a sentence based on a user input, according to another embodiment.

FIG. 7 illustrates a process of providing a sentence corresponding to a shorthand word in the apparatus 1000, according to another example embodiment.

When a user-inputtable application is executed in the apparatus 1000, as shown in FIG. 7, a user interface for a user input may be provided. FIG. 7 shows an English alphabet keyboard.

For English, the user may input an alphabet letter of each word or a certain symbol as a shorthand word of a sentence which the user desires to write. As shown in FIG. 7, the user may input a shorthand word consisting of alphabet letters and symbols "I e p w/ t @ y!".

The apparatus 1000 may acquire context information of the user before or after the shorthand word is input from the user.

For example, in FIG. 7, from the fact that a name of a counterpart is stored as "Jane", the apparatus 1000 may collect various pieces of data related to "Jane" to detect a relationship between "Jane" and the user. In addition, by confirming that an executed application is a chat application, the apparatus 1000 may detect that the chat application has a characteristic of transmitting and receiving various pieces of content including a message or has various functions for content transmission and reception. In addition, if there exist pieces of content input before the shorthand word is input, the apparatus 1000 may detect pieces of content previously transmitted to and received from "Jane" who is the counterpart, pieces of content input for a certain period, a subject repetitively appearing in chats, and the like. In addition, from the user's past user inputs, the apparatus 1000 may detect whether the user has a habit of not inputting a full sentence or not using a symbol or the like in a sentence and detect whether a certain word is included in most sentences.

The apparatus 1000 may provide a sentence corresponding to the shorthand word to the user based on the shorthand word and the context information. According to the example shown in FIG. 7, the apparatus 1000 may generate a sentence corresponding to the shorthand word "I e p w/ t @ y!" based on the facts that the shorthand word input from the user is "I e p w/ t @ y!", the counterpart is "Jane", and the chat application is being executed, the latest chat subject and/or chat atmosphere from past chat contents transmitted to and/or received from "Jane" through the chat application, and a used speech tone. The apparatus 1000 may provide, to the user, a sentence(s) corresponding to the shorthand word, which is generated from a learned data recognition model by using the shorthand word and the context information of the user as input values of the learned data recognition model.

As shown in FIG. 7, the apparatus 1000 may provide sentences such as "I eat pizza with Tiffany at yummy restaurant!" and "I enjoy party with Tom at y club!" to the user in response to the shorthand word "I e p w/ t @ y!".

The apparatus 1000 may replace the shorthand word with a sentence corresponding to the shorthand word and display the sentence, according to a selection of the user. As shown in FIG. 7, when the apparatus 1000 provides sentences such as "I eat pizza with Tiffany at yummy restaurant!" and "I enjoy party with Tom at y club!" in response to the shorthand word "I e p w/ t @ y!", the user may select a desired sentence from among the sentences such that the apparatus 1000 replaces the shorthand word "I e p w/ t @ y!" input from the user with the selected sentence and displays the selected sentence. The selected and displayed sentence can then be transmitted to Jane or the like.

Figure 8:
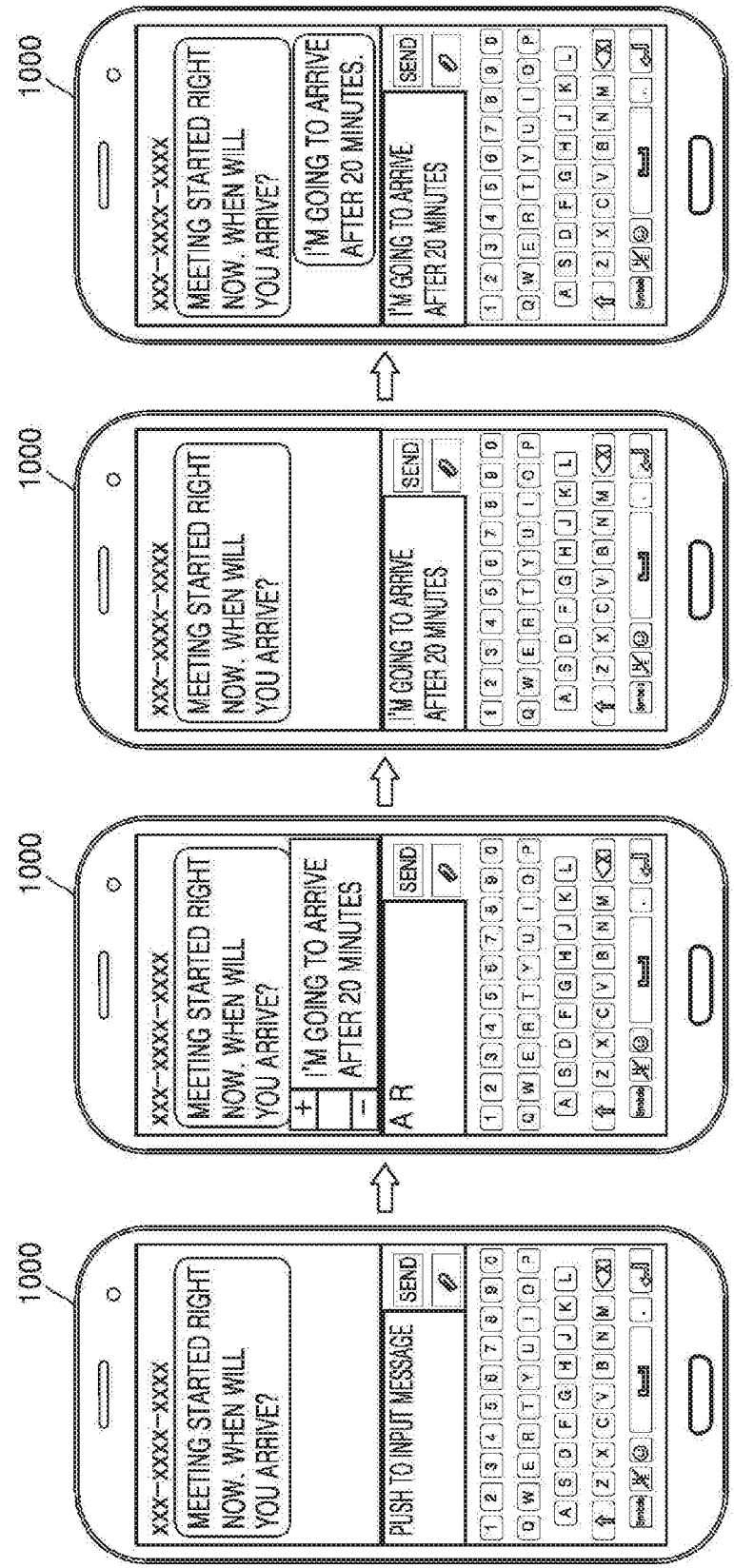
FIG. 8 illustrates a process of providing a sentence corresponding to a shorthand word in an apparatus for providing a sentence based on a user input, according to another embodiment.

FIG. 8 illustrates a process of providing a sentence corresponding to a shorthand word in the apparatus 1000, according to another example embodiment.

FIG. 8 illustrates a case where a text message is received from a counterpart, and thus the user executes a message application to check the received text message. When the message application is executed, the apparatus 1000 may provide a user interface for the message, which has been received from the counterpart, and a user input as shown in FIG. 8.

As shown in FIG. 8, the user may input a shorthand word consisting of "A R".

The apparatus 1000 may acquire context information of the user before or after the shorthand word is input from the user. When the user executes the message application and checks the received message in the apparatus 1000, the apparatus 1000 may acquire the context information of the user, such as a telephone number or name of a counterpart, execution of the message application, and the contents of the received message, even before the shorthand word is input. Alternatively, the apparatus 1000 may acquire the context information such as the telephone number or name of the counterpart, execution of the message application, and the contents of the received message when the shorthand word starts to be input or after the shorthand word is completely input.

In the example shown in FIG. 8, the apparatus 1000 may acquire the context information of the user, such as execution of the message application, the telephone number of the counterpart, a speech tone of the counterpart, recent message contents of the counterpart, a time when the message was received, and a location of the user. In the message application, since the user generally chats with the counterpart in a form of question and answer, the apparatus 1000 may generate a sentence by focusing on an answer to the message of the counterpart.

The apparatus 1000 may provide a sentence corresponding to the shorthand word to the user based on the shorthand word and the context information. According to the example shown in FIG. 8, the apparatus 1000 may generate a sentence corresponding to the shorthand word "A R" according to a predicted answer to a question of the counterpart based on the facts that the shorthand word input from the user is "A R" and the message application is being executed, a chat subject or a question of the counterpart from recent messages of the counterpart, and a used speech tone such as honorific.

When a selectable expression is included in the sentence corresponding to the shorthand word, the apparatus 1000 may provide a user interface through which the selectable expression may be selected, together with the sentence corresponding to the shorthand word. As shown in FIG. 8, the apparatus 1000 may provide, to the user, a sentence "I'm going to arrive after 20 minutes" corresponding to the shorthand word "A R". In this case, the apparatus 1000 may also provide a user interface through which a selectable expression may be selected, such that an expression such that a number "20" is adjustable (e.g., via the +/− shown in FIG. 8).

The apparatus 1000 may replace the shorthand word with a sentence corresponding to the shorthand word and display the sentence, according to a selection of the user. The user may select a desired sentence when the sentence corresponding to the shorthand word, which is displayed on the apparatus 1000, corresponds to the desired sentence, to replace the shorthand word input from the user with the sentence selected by the user. As shown in FIG. 8, when the apparatus 1000 provides the sentence "I'm going to arrive after 20 minutes" in response to the shorthand word "A R", the user may select the provided sentence such that the apparatus 1000 replaces the shorthand word "A R" input from the user with the selected sentence and displays the selected sentence. When the sentence "I'm going to arrive after 20 minutes" instead of the shorthand word "A R" is displayed in an input window of the user, the user may push a message transmission button to transmit the sentence corresponding to the shorthand word to the counterpart.

Figure 9:
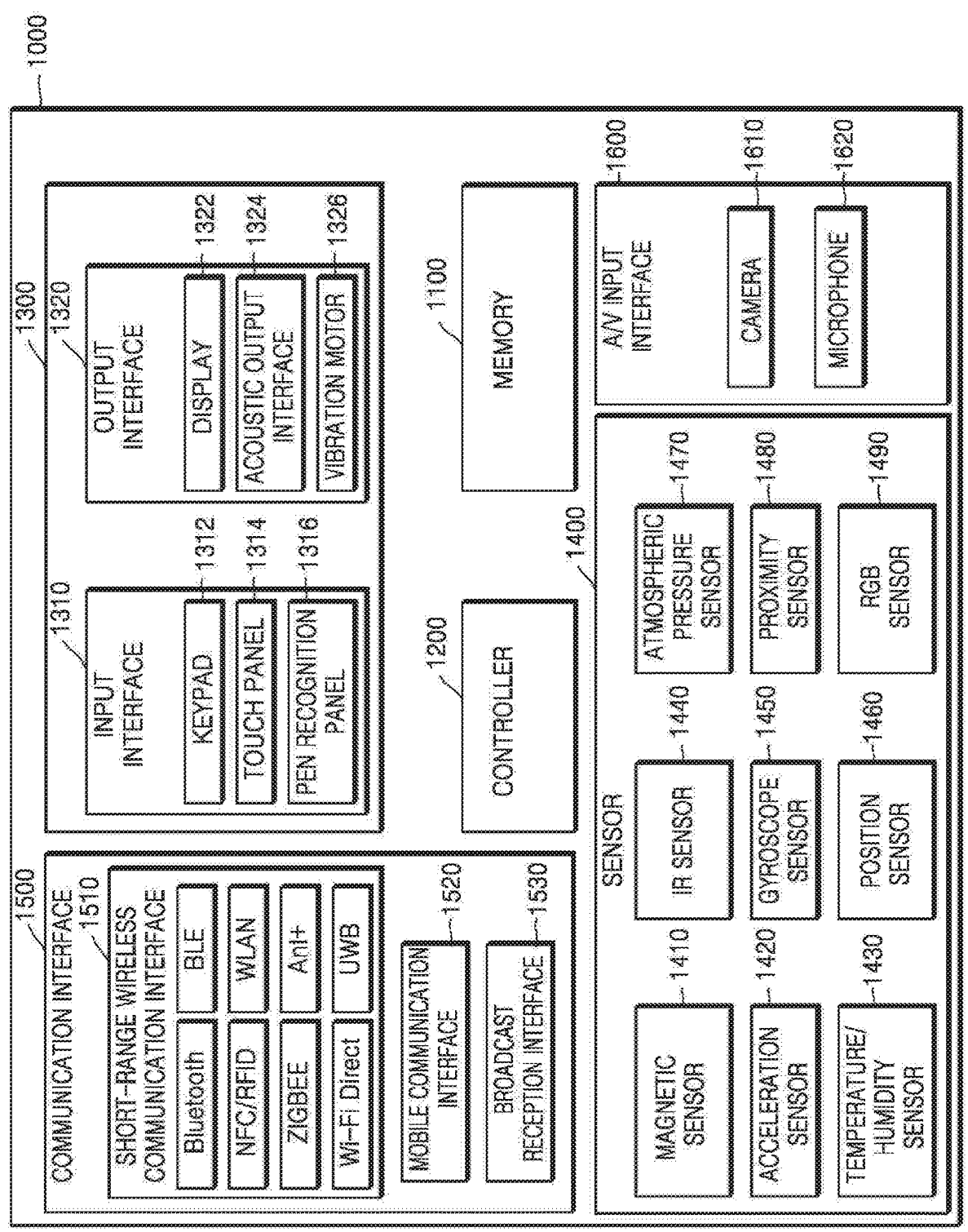
FIG. 9 is a block diagram for describing an apparatus for providing a sentence based on a user input, according to another embodiment.

FIG. 9 is a block diagram for describing the apparatus 1000, according to an example embodiment.

As shown in FIG. 9, the apparatus 1000 according to another embodiment may include the memory 1100, the controller 1200, the input and output interface 1300, a sensor 1400, a communication interface (including communication interface circuitry) 1500, and an audio/video (A/V) input interface (including A/V interface circuitry) 1600.

The memory 1100 may store programs for processing and control of the controller 1200 and store data input to the apparatus 1000 and/or output from the apparatus 1000. The memory 1100 may store computer-executable instructions.

The memory 1100 may include at least one type of storage medium from among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc.

The programs stored in the memory 1100 may be classified into a plurality of modules according to functions thereof, e.g., a user interface (UI) module, a touch screen module, an alarm module, and the like.

The UI module may provide a specified UI, a specified graphic UI (GUI), or the like interoperating with the apparatus 1000 for each application. The touch screen module may sense a touch gesture of the user on a touch screen and transmit information regarding the touch gesture to the controller 1200. According to some example embodiments, the touch screen module may recognize and analyze a touch code. The touch screen module may be configured by separate hardware. The touch gesture of the user may include a tap, a touch & hold, a double tap, a drag, a panning, a flick, a drag and drop, a swipe, or the like. The alarm module may generate a signal for informing of the occurrence of an event of the apparatus 1000. Examples of the event occurring in the apparatus 1000 may include message reception, key signal input, content input, content transmission, and content detection corresponding to a certain condition. The alarm module may output an alarm signal in a video signal form through a display 1322, in an audio signal form through an acoustic output interface 1324, or in a vibration signal form through a vibration motor 1326.

The controller 1200 may commonly control a general operation of the apparatus 1000. For example, the controller 1200 may generally control the input and output interface 1300, the sensor(s) 1400, the communication interface 1500, the A/V input interface 1600, and the like by executing programs stored in the memory 1100.

In detail, the controller 1200 may include at least one processor, including processing circuitry. The controller 1200 may include a plurality of processors or one integrated processor according to functions or roles thereof.

The at least one processor forming the controller 1200 may execute the computer-executable instructions stored in the memory 1100 to analyze a shorthand word input from the user and context information of the user, which has been acquired by the apparatus 1000, and to generate at least one sentence corresponding to the shorthand word based on the shorthand word and the context information. The at least one processor forming the controller 1200 may generate a sentence corresponding to a shorthand word by applying the shorthand word and context information of the user to a learned data recognition model. The context information of the user may be various kinds of data such as information about a counterpart, a type of an application through which a shorthand word is input, the contents of content input before the shorthand word is input, a user input pattern detected from a past user input history, a location of the user, and a time when a user input is performed. The learned data recognition model may be stored in a server outside the apparatus 1000 or received from the server in response to a request of the apparatus 1000.

The at least one processor forming the controller 1200 may learn a correlation between a shorthand word and a sentence based on the sentence corresponding to the shorthand word according to a selection of the user. The at least one processor forming the controller 1200 may use a shorthand word and a sentence corresponding to the shorthand word according to a selection of the user as data for learning of a data recognition model to be used to generate a sentence corresponding to a shorthand word.

The input and output interface 1300 may include a user input interface 1310 and a user output interface 1320. The input and output interface 1300 may be in a separated form of the user input interface 1310 and the user output interface 1320, and/or in a form of one integrated touch screen.

The input and output interface 1300 may receive a shorthand word from the user and provide a sentence corresponding to the shorthand word, which has been generated by the controller 1200, to the user. The input and output interface 1300 may replace the shorthand word with the sentence corresponding to the shorthand word and display the sentence corresponding to the shorthand word, according to a selection of the user. When a plurality of sentences correspond to the shorthand word, the input and output interface 1300 may provide a sentence corresponding to the shorthand word to the user based on priority indicating an optimal sentence with which the shorthand word is to be replaced. When a selectable expression is included in the sentence corresponding to the shorthand word, the input and output interface 1300 may also provide a user interface through which the selectable expression is selected.

The user input interface 1310 may be an interface through which the user inputs data for controlling the apparatus 1000. The user input interface 1310 may receive a shorthand word from the user and allow the user to select a sentence corresponding to a shorthand word.

The user input interface 1310 may include a keypad 1312, a touch panel 1314 (a capacitive overlay touch panel, a resistive overlay touch panel, an infrared (IR) beam touch panel, a surface acoustic wave touch panel, an integral strain gauge touch panel, a piezoelectric touch panel, or the like), a pen recognition panel 1316, and/or the like. The user input interface 1310 may include a jog wheel, a jog switch, and/or the like but is not limited thereto.

The output interface 1320 may output an execution result of an application in the apparatus 1000. The output interface 1320 may output an operation result of the apparatus 1000, and when there exists a user input, the output interface 1320 may output a result changed according to the user input.

The output interface 1320 may output an audio signal, a video signal, or a vibration signal and may include the display 1322 (e.g., LCD, LED, and/or OLED based display), an acoustic output interface 1324, and a vibration motor 1326.

The display 1322 displays information processed by the apparatus 1000. For example, the display 1322 may display an execution screen image of a messenger or SNS application or a user interface for receiving an operation of the user.

When the display 1322 and a touch pad form a layer structure to configure a touch screen, the display 1322 may be used as not only an output device but also an input device. The display 1322 may include at least one of a liquid crystal display, a thin-film transistor liquid crystal display, an organic light-emitting diode, a flexible display, a three-dimensional (3D) display, and an electrophoretic display. The apparatus 1000 may include two or more displays 1322 according to an implementation form of the apparatus 1000. The two or more displays 1322 may be arranged to face each other by using a hinge.

The acoustic output interface 1324 may output audio data received through the communication interface 1500 and/or stored in the memory 1100. In addition, the acoustic output interface 1324 may output an acoustic signal related to a function (e.g., a call signal reception sound, a message reception sound, or an alarm sound) performed by the apparatus 1000. The acoustic output interface 1324 may include a speaker, a buzzer, and the like.

The vibration motor 1326 may output a vibration signal. For example, the vibration motor 1326 may output a vibration signal corresponding to an output of audio data and/or video data (e.g., a call signal reception sound or a message reception sound). In addition, the vibration motor 1326 may output a vibration signal when a touch is input through a touch screen.

The sensor 1400, including sensor circuitry, may detect a state of the apparatus 1000 or an ambient state of the apparatus 1000 and transmit the detected information to the controller 1200.

The sensor 1400 may include at least one of a magnetic sensor 1410, an acceleration sensor 1420, a temperature/humidity sensor 1430, an IR sensor 1440, a gyroscope sensor 1450, a position sensor (e.g., global positioning system (GPS)) 1460, an atmospheric pressure sensor 1470, a proximity sensor 1480, and an RGB (illuminance) sensor 1490 but is not limited thereto. A function of each sensor may be intuitively inferred by those of ordinary skill in the art from a name thereof, and thus a detailed description thereof is omitted herein.

The communication interface 1500, including communication circuitry, may include at least one component for communicating between the apparatus 1000 and another device or a server. For example, the communication interface 1500 may include a short-range wireless communication interface 1510, a mobile communication interface 1520, and a broadcast reception interface 1530.

The short-range wireless communication interface 1510 may include a Bluetooth communication interface, a Bluetooth low energy (BLE) communication interface, a near-field communication interface, a wireless local area network (WLAN) (Wi-Fi) communication interface, a Zigbee communication interface, an infrared data association (IrDA) communication interface, a Wi-Fi Direct (WFD) communication interface, an ultra-wideband (UWB) communication interface, an Ant+ communication interface, and the like but is not limited thereto.

The mobile communication interface 1520 transmits and receives a wireless signal to and from at least one of a base station, an external terminal, and a server in a mobile communication network. Herein the wireless signal may include a voice call signal, a video call signal, or various types of data according to text/multimedia message transmission and reception.

The broadcast reception interface 1530 receives a broadcast signal and/or broadcast related information from the outside through a broadcast channel, and the broadcast channel may include a satellite channel and a terrestrial channel. According to implementation examples, the apparatus 1000 may not include the broadcast reception interface 1530.

In addition, the communication interface 1500 may communicate with another apparatus, a server, a peripheral device, or the like to transmit and receive or upload content.

The A/V input interface 1600 is to input an audio signal or a video signal and may include a camera 1610, a microphone 1620, and the like. The camera 1610 may obtain an image frame of a still image, a moving picture, or the like through an image sensor in a video call mode or a capturing mode. An image captured through the image sensor may be processed by the controller 1200 or a separate image processor (not shown).

An image frame processed by the camera 1610 may be stored in the memory 1100 or transmitted to the outside through the communication interface 1500. Two or more cameras 1610 may be provided according to a configuration aspect.

The microphone 1620 receives an external acoustic signal and processes the external acoustic signal to electrical voice data. For example, the microphone 1620 may receive an acoustic signal from an external device or the user. The microphone 1620 may use various noise cancellation algorithms to cancel noise generated during a process of receiving an external acoustic signal.

Figure 10:
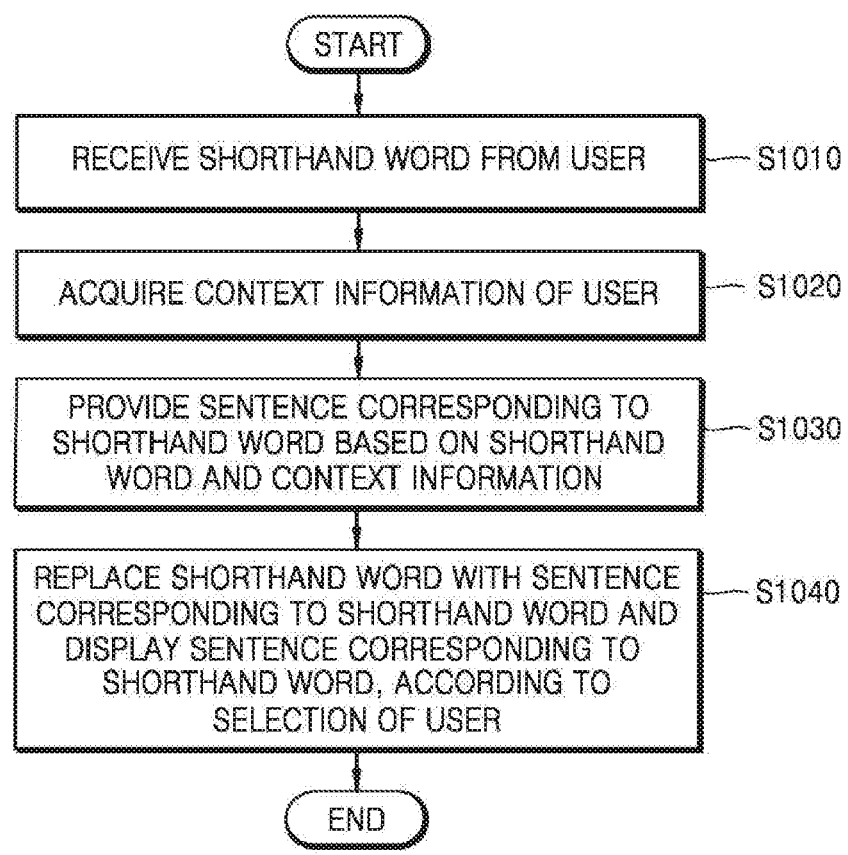
FIG. 10 is a flowchart illustrating a method of providing a sentence based on a user input, according to another embodiment.

FIG. 10 is a flowchart illustrating a method of providing a sentence based on a user input, according to another example embodiment.

In operation S1010, the apparatus 1000 receives a shorthand word from the user.

In operation S1020, the apparatus 1000 acquires context information of the user.

In operation S1030, the apparatus 1000 provides a sentence corresponding to the shorthand word to the user based on the shorthand word and the context information.

When a plurality of sentences correspond to the shorthand word, the apparatus 1000 may provide a sentence(s) corresponding to the shorthand word to the user based on priority indicating an optimal sentence with which the shorthand word is to be replaced. In addition, when a selectable expression is included in the sentence corresponding to the shorthand word, the apparatus 1000 may also provide a user interface through which the selectable expression is selected (e.g., see the +/− selector in FIG. 8 which may be used to adjust the number value 20).

The apparatus 1000 may provide, to the user, a sentence corresponding to the shorthand word, which is generated from a learned data recognition model by using the shorthand word and the context information of the user as input values of the learned data recognition model. When the context information is information about a counterpart, the apparatus 1000 may provide a sentence corresponding to the shorthand word based on the shorthand word and a relationship between the counterpart and the user. When the context information is a type of an application through which a shorthand word is input, the apparatus 1000 may provide a sentence corresponding to the shorthand word based on the shorthand word and a characteristic or function of the application. When the context information is the contents of content input before the shorthand word is input, the apparatus 1000 may provide a sentence corresponding to the shorthand word based on the shorthand word and the contents of content input before the shorthand word is input. When the context information is a user input pattern detected from a past user input history, the apparatus 1000 may provide a sentence corresponding to the shorthand word based on the shorthand word and the user input pattern.

In operation S1040, the apparatus 1000 replaces the shorthand word with the sentence corresponding to the shorthand word and displays the sentence corresponding to the shorthand word, according to a selection of the user. The apparatus 1000 may learn a correlation between the shorthand word and the sentence corresponding to the shorthand word based on the sentence according to the selection of the user.

Figure 11:
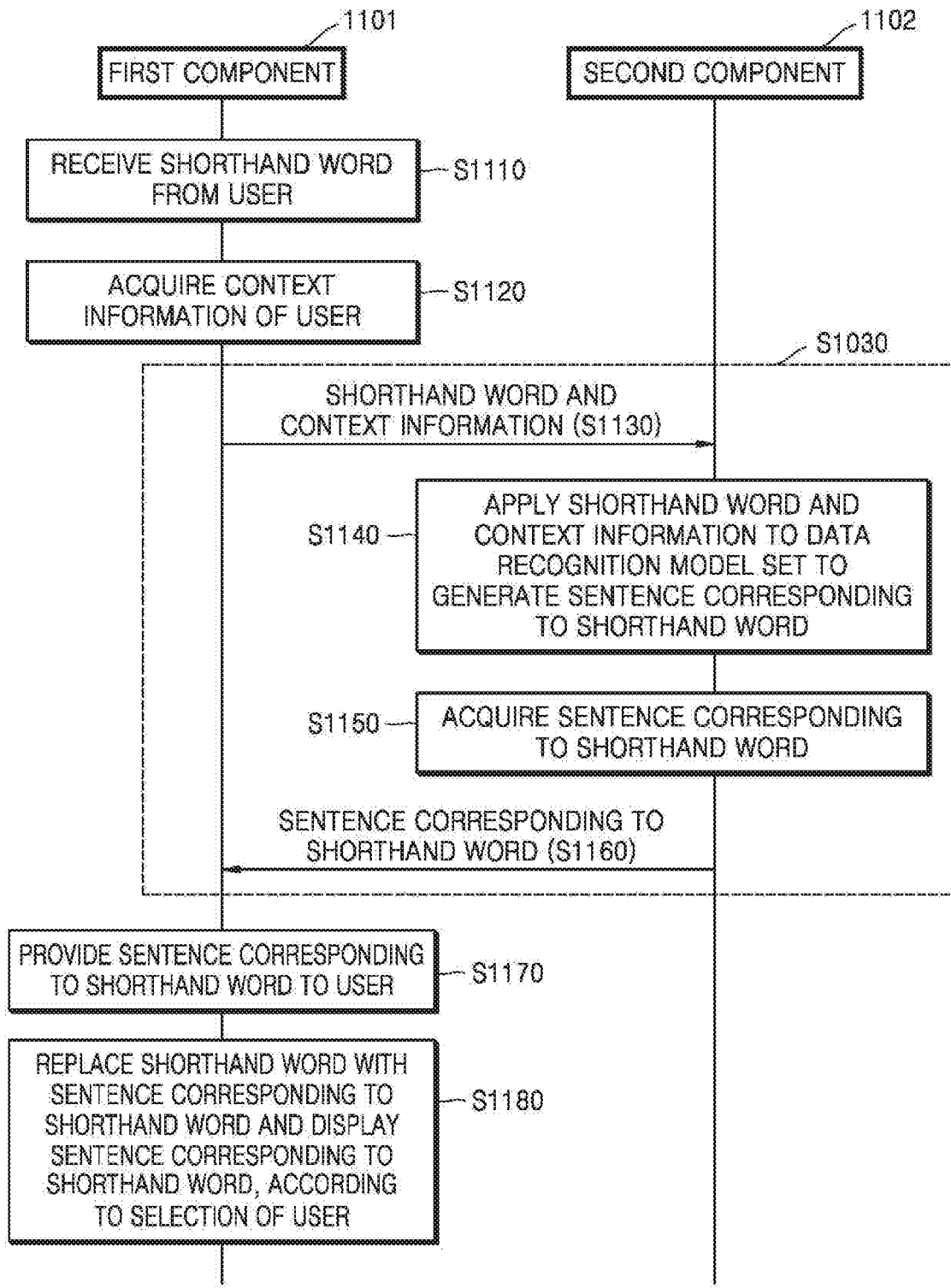

FIGS. 11 and 12 are flowcharts of a network system using a data recognition model, according to example embodiments.

In FIG. 11, the network system may include a first component 1101 and a second component 1102. Herein, the first component 1101 may be the device 1000, and the second component 1102 may be the server 2000 in which a data recognition model is stored or a cloud including at least one server. Alternatively, the first component 1101 may be or include a general-use processor, and the second component 1102 may be or include an AI exclusive processor. Alternatively, the first component 1101 may be at least one application, and the second component 1102 may be an OS. That is, the second component 1102 may be a component capable of more quickly and effectively processing a number of computations required to generate, update, or apply a data recognition model than the first component 1101, as a component which is more integrated, is more exclusive, has a less delay, has better performance, or has more resources than the first component 1101.

An interface for transmitting/receiving data may be defined between the first component 1101 and the second component 1102.

For example, an API having, as a factor value (or a medium value or a transfer value), data for learning to be applied to a data recognition model may be defined. The API may be defined as a set of sub-routines or functions which may be called for any one protocol (for example, a protocol defined by the apparatus 1000) to perform certain processing of another protocol (for example, a protocol defined by the server 2000). That is, an environment in which an operation of another protocol may be performed in any one protocol may be provided through the API.

According to an example embodiment, in operation S1110 in FIG. 11, the first component 1101 may receive a shorthand word from a user.

In operation S1120, the first component 1101 may acquire context information of the user.

In operation S1130, the first component 1101 may transmit the shorthand word and the context information to the second component 1102. For example, the first component 1101 may use the shorthand word and the context information as factor values of an API function provided to use a data recognition model. The API function may transmit the shorthand word and the context information to the second component 1102 as data to be applied to the data recognition model. In this case, the first component 1101 may change the shorthand word or a sentence according to a preset communication format and transmit the changed shorthand word or sentence to the second component 1102.

In operation S1140, the second component 1102 may apply the received shorthand word and context information to a data recognition model set to generate a sentence corresponding to the shorthand word. For example, the second component 1102 may apply the received shorthand word and context information as input values for the data recognition model stored in the second component 1102.

In operation S1150, the second component 1102 may acquire a sentence corresponding to the shorthand word as an application result. For example, when the context information is a type of an application through which the shorthand word has been input, the second component 1102 may acquire a sentence corresponding to the shorthand word based on the shorthand word and a characteristic or function of the application by using the data recognition model. Alternatively, when the context information is the contents of content input before the shorthand word is input, the second component 1102 may acquire a sentence corresponding to the shorthand word based on the shorthand word and the contents of the content input before the shorthand word is input, by using the data recognition model. Alternatively, when the context information is a user input pattern detected from a past user input history, the second component 1102 may acquire a sentence corresponding to the shorthand word based on the shorthand word and the user input pattern by using the data recognition model.

In operation S1160, the second component 1102 may transmit the sentence corresponding to the shorthand word to the first component 1101. In this case, the second component 1102 may change the sentence corresponding to the shorthand word according to a preset format and transmit the changed sentence to the first component 1101.

In operation S1170, the first component 1101 may provide the sentence corresponding to the shorthand word to the user.

In operation S1180, the first component 1101 may replace the shorthand word with the sentence corresponding to the shorthand word and display the sentence corresponding to the shorthand word, according to a selection of the user. The sentence may then be transmitted, via an appropriate network (e.g., WiFi, cellular, etc.) to another electronic device such as a smartphone, computer, and/or the like.

In FIG. 11, operations S1130 to S1170 may correspond to operation S1030 in FIG. 10. That is, the operation in FIG. 10 of providing a sentence corresponding to a shorthand word to the user based on the shorthand word and context information may include the operations in FIG. 11 in which the first component 1101 transmits a shorthand word and context information to the second component 1102, receives a sentence corresponding to the shorthand word, which is an application result to the data recognition model, from the second component 1102, and provides the sentence corresponding to the shorthand word to the user.

FIG. 12 is a flowchart of a network system using a data recognition model, according to an example embodiment.

In FIG. 12, the network system may include a first component 1201, a second component 1202, and a third component 1203. Herein, the first component 1201 may correspond to the first component 1101 in FIG. 11, which has been described above, and the second component 1202 and the third component 1203 may correspond to the second component 1102 in FIG. 11, which has been described above.

In this case, the second component 1202 and the third component 1203 may store different data recognition models.

For example, the second component 1202 and the third component 1203 may store and/or use different data recognition models identified according to types of context information. For example, the second component 1202 may store a data recognition model to be used when a style before or after a sentence or a style of the sentence is formal, and the third component 1203 may store a data recognition model to be used when a style before or after a sentence informal. Alternatively, the second component 1202 may store a data recognition model to be used when a type of an application through which a sentence is provided is a message application, a messenger application, or a mail application, and the third component 1203 may store a data recognition model to be used when a type of an application through which a sentence is provided is an editing application (a Word application or a Hangeul application).

According to an example embodiment, in operation S1210 in FIG. 12, the first component 1201 may receive a shorthand word from a user.

In operation S1220, the first component 1201 may acquire context information of the user.

In operation S1230, the first component 1201 may determine a type of the context information.

As a result of the determination, when the type of the context information is first context information, the first component 1201 may transmit the shorthand word and the first context information to the second component 1202 in operation S1240.

In operation S1250, the second component 1202 may apply the received shorthand word and first context information to a data recognition model set to generate a sentence corresponding to the shorthand word. In this case, the data recognition model may be a data recognition model learned based on the first context information. For example, the data recognition model may be a data recognition model learned by using formal sentences as data for learning.

When the second component 1202 transmits a sentence corresponding to the shorthand word, which has been acquired using the data recognition model, to the first component 1201 in operations S1260 and S1270, the first component 1201 may provide the sentence corresponding to the shorthand word to the user in operations S1280 and S1290. The description corresponding to operations S1260 to S1290 corresponds to S1150 to S1180 in FIG. 11, and thus a corresponding description is omitted herein.

If the type of the context information is second context information as a result that the first component 1201 has determined the type of the context information in operation S1240, the first component 1201 may transmit the shorthand word and the second context information to the third component 1203 in operation S1310.

In operation S1320, the third component 1203 may apply the received shorthand word and second context information to a data recognition model set to generate a sentence corresponding to the shorthand word. In this case, the data recognition model may be a data recognition model learned based on the second context information. For example, the data recognition model may be a data recognition model learned by using informal sentences as data for learning.

When the third component 1203 transmits a sentence corresponding to the shorthand word, which has been acquired using the data recognition model, to the first component 1201 in operations S1330 and S1340, the first component 1201 may provide the sentence corresponding to the shorthand word to the user in operations S1280 and S1290. The description corresponding to operations S1280, S1290, 1330, and 1340 corresponds to S1150 to S1180 in FIG. 11, and thus a corresponding description is omitted herein.

The above-described method of the providing a sentence based on a user input can be written as computer programs and can be implemented in general-use digital computers that execute the programs using a non-transitory computer-readable recording medium. Examples of the non-transitory computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magnetooptical data storage device, an optical data storage device, a hard disk, a solid-state disc (SSD), and any device capable of storing instructions or software, relevant data, data files, and data structures and providing instructions or software, relevant data, data files, and data structures to a processor or a computer such that the processor or computer can execute the instructions.

In addition, the methods according to the disclosed embodiments may be provided as a computer program product. The computer program product may include a software (S/W) program, a non-transitory computer-readable recording medium in which the S/W program is stored, or a product traded between a seller and a purchaser. For example, the computer program product may include an electronic device (the apparatus) 1000, a manufacturer of the electronic device 1000, the server 2000, a manufacturer of the server 2000, or a product (e.g., a downloadable application) in a form of a S/W program electronically distributed through an electronic market (e.g., Google Play Store or App Store). For the electronic distribution, at least a portion of the S/W program may be stored in a storage medium or temporarily generated. In this case, the storage medium may be a storage medium of a server in the manufacturer or the electronic market or a relay server.

While the present disclosure has been particularly shown and described with reference to embodiments thereof, it will be understood by those skilled in the art that various changes in form and details may be made therein without departing from the essential characteristics. Therefore, the embodiments should be considered in descriptive sense only and not for purposes of limitation. The scope of the present disclosure is defined not by the detailed description of the embodiments but by the appended claims, and all differences within the scope will be construed as being included in the scope of the present disclosure.

What is claimed is:

1. An apparatus for providing a sentence based on a user input, the apparatus comprising:
   a memory configured to store computer-executable instructions;
   at least one processor configured to execute the computer-executable instructions to analyze a shorthand word input from a user and context information related to the user, which has been acquired by the apparatus, and generate a sentence corresponding to the shorthand word based on the shorthand word and the context information;
   an input and output interface configured to receive the shorthand word from the user, provide the sentence or phrase corresponding to the shorthand word to the user, and replace the shorthand word with the sentence or phrase corresponding to the shorthand word and display the sentence or phrase corresponding to the shorthand word according to a selection of the user; and
   wherein, upon initially displaying the sentence or phrase corresponding to the shorthand word, when an editable character is included in the sentence or phrase corresponding to the shorthand word, the input and output interface is configured to display a user interface (UI) for allowing a user to edit the editable character in the displayed sentence or phrase corresponding to the shorthand word.

2. The apparatus of claim 1, wherein, when the sentence or phrase corresponding to the shorthand word comprises a plurality of sentences or phrases, the input and output interface is further configured to provide a sentence or phrase that is from among the plurality of sentences or phrases and corresponds to the shorthand word to the user based on priority indicating an optimal sentence or phrase with which the shorthand word is to be replaced.

3. The apparatus of claim 1, wherein the at least one processor is further configured to generate the sentence or phrase corresponding to the shorthand word by applying the shorthand word and the context information of the user to a data recognition model learned using an artificial intelligence algorithm.

4. The apparatus of claim 3, wherein the data recognition model is stored in an external server and/or received from the server in response to a request of the apparatus.

5. The apparatus of claim 1, wherein the context information comprises information related to a counterpart of the user, and
   the at least one processor is further configured to generate the sentence or phrase corresponding to the shorthand word based on the shorthand word and a relationship between the counterpart and the user.

6. The apparatus of claim 1, wherein the context information comprises a type of an application through which the shorthand word is input, and
   the at least one processor is further configured to generate the sentence or phrase corresponding to the shorthand word based on the shorthand word and a characteristic and/or function of the application.

7. The apparatus of claim 1, wherein the context information comprises contents of content input before the shorthand word is input, and
   the at least one processor is further configured to generate the sentence or phrase corresponding to the shorthand word based on the shorthand word and the contents of content input before the shorthand word is input.

8. The apparatus of claim 1, wherein the context information comprises a user input pattern detected from a past user input history, and
   the at least one processor is further configured to generate the sentence or phrase corresponding to the shorthand word based on the shorthand word and the user input pattern.

9. The apparatus of claim 1, wherein the at least one processor is further configured to learn a correlation between the shorthand word and the sentence or phrase based on the sentence or phrase corresponding to the shorthand word according to the selection of the user.

10. A method of providing a sentence based on a user input, the method comprising:
    receiving a shorthand word from a user,
    acquiring context information related to the user;
    providing a sentence or phrase corresponding to the shorthand word to the user based on the shorthand word and the context information;
    replacing the shorthand word with the sentence or phrase corresponding to the shorthand word and displaying the sentence or phrase corresponding to the shorthand word according to a selection of the user; and
    upon initially displaying the sentence or phrase corresponding to the shorthand word, when an editable character is included in the sentence or phrase corresponding to the shorthand word, displaying a user interface (UI) for allowing a user to edit the editable character in the displayed sentence or phrase corresponding to the shorthand word.

11. The method of claim 10, wherein the providing comprises providing, when the sentence or phrase corresponding to the shorthand word comprises a plurality of sentences or phrases, a sentence or phrase that is from among the plurality of sentences or phrases and corresponds to the shorthand word to the user based on priority indicating an optimal sentence or phrase with which the shorthand word is to be replaced.

12. The method of claim 10, wherein the providing comprises providing, to the user, a sentence or phrase corresponding to the shorthand word, which is generated from a data recognition model learned using an artificial intelligence algorithm by using the shorthand word and the context information of the user as input values of the learned data recognition model.

13. The method of claim 10, wherein the context information comprises information about a counterpart of the user, and
    the providing comprises providing the sentence or phrase corresponding to the shorthand word to the user based on the shorthand word and a relationship between the counterpart and the user.

14. The method of claim 10, wherein the context information comprises a type of an application through which the shorthand word is input, and
    the providing comprises providing the sentence or phrase corresponding to the shorthand word based on the shorthand word and a characteristic and/or function of the application.

15. The method of claim 10, wherein the context information comprises contents of content input before the shorthand word is input, and the providing comprises providing the sentence or phrase corresponding to the shorthand word to the user based on the shorthand word and the contents of content input before the shorthand word is input.

16. The method of claim 10, wherein the context information comprises a user input pattern detected from a past user input history, and
the providing comprises providing the sentence or phrase corresponding to the shorthand word to the user based on the shorthand word and the user input pattern.

17. The method of claim 10, further comprising learning a correlation between the shorthand word and the sentence or phrase based on the sentence or phrase corresponding to the shorthand word according to the selection of the user.

18. A non-transitory computer-readable recording medium having recorded thereon a program for executing, in a computer, the method of claim 10.

* * * * *